US008632719B2

(12) United States Patent
Ohya et al.

(10) Patent No.: US 8,632,719 B2
(45) Date of Patent: Jan. 21, 2014

(54) METHOD FOR MANUFACTURING AN INJECTION-MOLDED OBJECT

(75) Inventors: Satoshi Ohya, Sakura (JP); Toshiro Ariga, Sakura (JP)

(73) Assignee: DIC Corporation, Tokyo (JP)

(*) Notice: Subject to any disclaimer, the term of this patent is extended or adjusted under 35 U.S.C. 154(b) by 0 days.

(21) Appl. No.: 13/577,801

(22) PCT Filed: Feb. 28, 2011

(86) PCT No.: PCT/JP2011/054479
§ 371 (c)(1),
(2), (4) Date: Dec. 6, 2012

(87) PCT Pub. No.: WO2011/108483
PCT Pub. Date: Sep. 9, 2011

(65) Prior Publication Data
US 2013/0075959 A1  Mar. 28, 2013

(30) Foreign Application Priority Data

Mar. 5, 2010  (JP) ................................ 2010-049062
Aug. 2, 2010  (JP) ................................ 2010-173547

(51) Int. Cl.
*B28B 7/10* (2006.01)
*H05B 6/00* (2006.01)
*B29C 67/00* (2006.01)
*A61M 25/00* (2006.01)
*A23G 3/12* (2006.01)

(52) U.S. Cl.
USPC ........... 264/334; 264/259; 264/264; 264/299; 264/319; 264/320; 264/328.1; 264/478; 264/492

(58) Field of Classification Search
USPC ......... 264/478, 492, 259, 264, 299, 319, 320, 264/328.1, 334; 425/127
See application file for complete search history.

(56) References Cited

U.S. PATENT DOCUMENTS

| 3,962,009 A * | 6/1976 | Minami et al. .................. 156/85 |
| 4,117,181 A * | 9/1978 | Minami et al. ................. 428/138 |
| 4,136,224 A * | 1/1979 | Minami et al. ................. 428/161 |
| 6,217,986 B1 * | 4/2001 | Miki et al. ..................... 428/201 |
| 7,001,659 B2 * | 2/2006 | Iriyama ....................... 428/195.1 |
| 7,318,905 B2 * | 1/2008 | Iriyama ......................... 264/266 |
| 2008/0032070 A1 * | 2/2008 | Hirschfelder et al. .......... 428/30 |

FOREIGN PATENT DOCUMENTS

JP  50-059448 A     5/1975
JP  50061455 A  *  5/1975

(Continued)

OTHER PUBLICATIONS

International Search Report of PCT/JP2011/054479, mailing date of Mar. 29, 2011.

*Primary Examiner* — Atul P. Khare
(74) *Attorney, Agent, or Firm* — Westerman, Hattori, Daniels & Adrian, LLP

(57) ABSTRACT

A method for producing an injection-molded product includes steps of placing, in an injection mold, a heat-shrinkable resin sheet having region A and region B which have different surface temperatures when irradiated with infrared rays; integrating the resin sheet with an injection molding resin by injecting the injection molding resin into the mold; and, before the resin sheet is placed in the injection mold or before the integration step after the placing of the resin sheet in the injection mold, irradiating the resin sheet with infrared rays so that the surface temperatures of region A and region B are different from each other and the surface temperature of at least region A is equal to or higher than an orientation release stress inflection point temperature T of the resin sheet, thereby forming a difference in thickness between regions A and B.

3 Claims, 22 Drawing Sheets

(56) References Cited

FOREIGN PATENT DOCUMENTS

| JP | 53-105558 A | 9/1978 |
| JP | 2004-284178 A | 10/2004 |
| JP | 2004284178 A * | 10/2004 |
| JP | 2004322568 A * | 11/2004 |
| JP | 2009-143246 A | 7/2009 |
| JP | 2010-082912 A | 4/2010 |
| WO | 2010/113601 A1 | 10/2010 |

* cited by examiner

US 8,632,719 B2

METHOD FOR MANUFACTURING AN INJECTION-MOLDED OBJECT

TECHNICAL FIELD

The present invention relates to a method for producing an injection-molded product having a feeling of three-dimensional design with a visual concave-convex pattern.

BACKGROUND ART

Known methods for decorating injection-molded products etc. include a simultaneous injection molding-lamination method and a simultaneous injection molding-transfer method, in each of which a printed sheet is placed in an injection mold and a molding resin is injection-molded to produce a molded product with a surface coated with the printed sheet. These methods generally include integrally molding the injection molding resin with the sheet so that a printed layer is disposed on the back side (injection molding resin side) of the substrate sheet, thereby producing a molded product having a flat surface and a uniform glossy appearance and failing to provide a surface of the molded product with a feeling of concave-convex patterned design.

Examples of the concave-convex patterned design include a design having a surface with a concave-convex pattern which can be felt visually and tactilely and a design having a flat surface with a visible concave-convex pattern (depth feel).

A known method for producing an injection-molded product having a concave-convex patterned surface includes previously forming fine crimps, which form projections and depressions, on a cavity surface of an injection mold, thereby forming projections and depressions on a surface of the injection-molded product. However, this method has the problem of increasing cost due to the need to form projections and depressions on each mold and difficulty of injecting the injection molding resin into the fine crimps, thereby causing difficulty in accurately reproducing fine projections and depressions and in conforming the projections and depressions to a print pattern.

There is also a known method of forming projections and depressions, in which a shaping sheet or a shaping film is placed in an injection mold and then separated after injection molding, the shaping film being produced by curing a photo-curable resin composition using, as a mold, a metal stamper plate or a shaping sheet having projections and depressions which are previously physically formed on a surface thereof by press-contact of a heated engraved roll for embossing or schreinerizing (refer to, for example, Patent Literature 1). However, the shaping sheet having projections and depressions physically formed thereon has the problem that embossed portions are plastically deformed by orientation returning when exposed to a high resin temperature during injection molding, failing to create desired projections and depressions. In addition, the method uses an embossing apparatus or a stamper plate, and thus the plate is required to be remade according to the concave-convex pattern. Further, since projections and depressions are imparted in the sheet forming process, the projections and depressions have been produced in a wound state, thereby easily causing weaving defect and gauge band defect due to overlapping of projecting portions. This results in the problem of requiring careful handling.

On the other hand, examples known as the injection-molded product having a smooth surface but also having a visible concave-convex pattern (depth feel) includes those disclosed in Patent Literatures 2 and 3. The method of Patent Literature 2 has the need to prevent embossed portions from disappearing by injection molding pressure and thus includes embossing a film, filling embossed depressions with a resin such as an acryl resin, and integrating the film with a molding resin by injection molding. However, this method includes the step of embossing the sheet and the step of applying the resin to the sheet, thereby complicating the process. In addition, the method of Patent Literature 3 includes embossing a laminate which contains a transparent resin base sheet and a photoluminescent layer to form a high-gloss region and a low-gloss region in a surface of the transparent resin base sheet and to form thick and thin regions in the transparent resin base sheet corresponding to the high-gloss region and the low-gross region, and then integrating the sheet with a molding resin by injection molding. However, this method has the problem of the need to conform the high-gloss and low-gloss regions formed by printing to the embossed portions, and thus an unusual technique is required for completely conforming print regions to projections and depressions of a design which requires a fine pattern.

These methods require the embossing apparatus and have the need to remake the plate according to the concave-convex pattern.

CITATION LIST

Patent Literature

PTL 1: Japanese Unexamined Patent Application Publication No. 2004-284178
PTL 2: Japanese Unexamined Patent Application Publication No. 2010-82912
PTL 3: Japanese Unexamined Patent Application Publication No. 2009-143246

SUMMARY OF INVENTION

Technical Problem

A problem to be solved by the present invention is to provide a method for producing, without including embossing, an injection-molded product having a concave-convex patterned surface or having a smooth surface and at least a feel of three-dimensional design with a visual convex-concave pattern, such as a visible concave-convex pattern (depth feel).

Solution to Problem

The inventors found that before or during the time when a heat-shrinkable resin sheet having a region A and a region B, which have different surface temperatures when irradiated with infrared rays, is placed in an injection mold, the resin sheet is irradiated with infrared rays so that the surface temperatures of the region A and the region B are different from each other, and the surface temperature of at least the region A is equal to or higher than an orientation release stress inflection point temperature T of the resin sheet to create a difference in thickness between the region A and the region B, and then integrating the resin sheet with an injection molding resin by injecting the injection molding resin, thereby producing an injection-molded product having at least a feel of three-dimensional design with a visual concave-convex pattern.

The heat-shrinkable resin sheet shrinks by heating due to restoration to a state before stretching. The force exhibited at the time of shrinkage is orientation returning strength which varies with heating temperatures.

The inventors found that when the heat-shrinkable sheet is heated while being supported so that the surface temperatures of a plurality of regions present in the same plane of the resin sheet are different from each other, and the surface temperature of at least one of the plurality of regions is equal to or higher than the orientation release stress inflection point temperature T of the resin sheet, a difference in thickness occurs between the regions as a result of different behaviors of the plurality of regions of the sheet. In the present invention, it was successful to intentionally produce a difference in thickness, i.e., projections and depressions, by using the difference in temperature of the sheet.

In order to irradiate the resin sheet with infrared rays so that the plurality of regions present on the same plane have different surface temperatures (in this case, a region having a relatively high surface temperature is referred to as "region A", and a region having a relatively low surface temperature is referred to as "region B"), specifically, a method using an infrared absorbing ink or infrared reflecting ink can be used ((1) to (3) described below).

The infrared absorbing ink or infrared reflecting ink is an ink reactive to infrared rays.

The infrared absorbing ink is an ink containing an infrared absorber or the like, and generates heat by absorption of the infrared rays applied. When the resin sheet printed with the infrared absorbing ink is irradiated with infrared rays, heat in an amount larger than that applied by infrared irradiation is applied only to a region printed with the infrared absorbing ink.

On the other hand, the infrared reflecting ink is an ink containing an infrared reflecting material, and reflects the infrared rays applied. When the resin sheet printed with the infrared reflecting ink is irradiated with infrared rays from the resin sheet side (i.e., the surface opposite to the print surface of the resin sheet), infrared rays transmitted through the resin sheet are reflected by the infrared reflecting ink to apply heat in an amount larger than that applied by infrared irradiation only to a print portion where infrared rays are transmitted and reflected (specifically, this is estimated to result from the higher-efficient heat supply to the region A than to the region B not provided with a picture in the sheet).

That is, heat in an amount larger than that applied by infrared irradiation is applied only to the region printed with the infrared absorbing ink or infrared reflecting ink, thereby increasing the surface temperature of this region, resulting in a temperature difference between the region printed with the infrared absorbing ink and the region not printed with the ink in the resin sheet.

Specifically, (1) the heat-shrinkable resin sheet having a picture provided with the infrared absorbing ink or infrared reflecting ink is irradiated with infrared rays so that a region A having the pattern provided with the infrared absorbing ink or infrared reflecting ink and a region B not having the picture have different surface temperatures. Since heat in an amount larger than that applied by infrared irradiation is applied to only the region A, the surface temperature of the region A is higher than that of the unprinted region B.

Alternatively, (2) the heat-shrinkable resin sheet having a picture provided with the infrared absorbing ink or infrared reflecting ink so as to have the high-ink-density region A and the low-ink-density region B is irradiated with infrared rays so that the high-ink-density region A and the low-ink-density region B have different surface temperatures. In this case, although heat in an amount larger than that applied by infrared irradiation is applied to both the region A and the region B, a larger amount of heat is applied to the region A because of a higher ink density. Therefore, the surface temperature of the region A is relatively higher than the region B.

Alternatively, (3) the heat-shrinkable resin sheet having a picture provided with plural types of infrared absorbing inks or infrared reflecting inks having different infrared absorptances or reflectances is irradiated with infrared rays so that a region A having a pattern provided with an ink of high infrared absorptance or reflectance and a region B having a pattern provided with an ink of low infrared absorptance or reflectance have different surface temperatures. In this case, although heat in an amount larger than that applied by infrared irradiation is applied to both the region A and the region B, a larger amount of heat is applied to the region A because the ink has higher infrared absorptance or reflectance. Therefore, the surface temperature of the region A is relatively higher than the region B.

The sheet having a difference in thickness includes projections and depressions which are evenly produced on both surfaces of the sheet. The sheet having the projections and depressions produced therein is placed in an injection mold and integrated with an injection molding resin by injecting the injection molding resin into the mold, thereby producing an injection-molded product having a feel of three-dimensional design with a visual concave-convex pattern. The infrared irradiation step may be performed either before or after the resin sheet is placed in the mold and can be appropriately selected according to the molding machine used. In addition, the sheet can be separated after being integrated with the resin. In this case, the injection-molded product having a concave-convex pattern formed on a surface thereof can be produced. Since the sheet used has a concave-convex shape with relaxed internal stress, complicated projections and depressions can be reproduced without missing of the projections and depressions during removal.

The present invention provides a method for producing an injection-molded product, the method including:

a step of placing, in an injection mold, a heat-shrinkable resin sheet having a region A and a region B which have different surface temperatures when irradiated with infrared rays;

a step of integrating the resin sheet with an injection molding resin by injecting the injection molding resin into the mold; and before the resin sheet is placed in the injection mold or after placed in the injection mold and before integrated with the resin, a step of irradiating the resin sheet with infrared rays so that the surface temperatures of the region A and the region B are different from each other and the surface temperature of at least the region A is equal to or higher than an orientation release stress inflection point temperature T of the resin sheet, thereby forming a difference in thickness between the region A and the region B.

Advantageous Effects of Invention

According to the present invention, it is possible to produce, without embossing, an injection-molded product having a concave-convex patterned surface or having a smooth surface but also having at least a feel of three-dimensional design with a visual convex-concave pattern, such as a visible concave-convex pattern (depth feel).

In the present invention, in any one of the methods (1) to (3) which allow a plurality of regions present in the same plane of the resin sheet to have different surface temperatures, projections and depressions appear in regions of the pattern provided with the infrared absorbing ink or infrared reflecting ink. Therefore, the print regions can be completely conformed to the projections and depressions. The pattern can be printed with the ink by a general-purpose printing method such as gravure printing, screen printing, or ink jet printing, without the need for a physical method using an embossing apparatus or the like for imparting projections and depressions. Therefore, failures such as weaving, gauge band, etc. little occur, and an excessive apparatus is not required, suppressing the cost.

DESCRIPTION OF EMBODIMENTS

Definition of Projections and Depressions

In the present invention, as described above, projections and depressions are formed due to a difference in surface temperature between a region A and a region B adjacent to each other in the same plane of a heat-shrinkable resin sheet in a state of being supported. In the present invention, a region having a relatively high surface temperature is defined as a "region A", and a region having a relatively low surface temperature is defined as a "region B". In this case, the region A is relatively depressed, and the region B is relatively projected.

The region A is considered to be formed by thinning in a central portion due to the self shrinkage behavior when orientation returning of the resin sheet is started by plasticization of the resin during infrared irradiation of the heat-shrinkable resin sheet.

Under a condition where the resin sheet is not supported, a change in thickness by the self shrinkage behavior has the tendency that the thickness wholly increases by overall shrinkage with no starting point. However, under a condition where the resin sheet is supported with a clamp or the like, it is considered that shrinkage tends to start from a clamp portion at a low temperature, resulting in thinning of the region A. Therefore, the region A frequently becomes thinner than the resin sheet before infrared irradiation, i.e., before shrinkage.

On the other hand, the region B is a region adjacent to the region A and having a surface temperature which is different from that of the region A and relatively lower than that of the region A. However, the region B is considered to be formed by movement of the resin components present in the region A due to the occurrence of thinning at a central portion of the region A or by self shrinkage, so that the thickness of the region B is relatively larger than that of the region A. In many cases, the region B becomes relatively thicker than the resin sheet before infrared irradiation, i.e., before shrinkage. In addition, an increase in thickness is observed at the boundary between the region A and the region B. Consequently, a strong concave-convex feel can be attained.

An example of formation of the projections and depressions is shown in FIGS. 1 and 2. FIG. 1 is a drawing illustrating a specific example in which a heat-shrinkable sheet having a picture printed with three types of inks including a high-density infrared absorbing ink, a low-density infrared absorbing ink, and a (infrared-non-absorbing) color ink is irradiated with infrared rays using an infrared heater. FIG. 2 is a drawing illustrating the state of the resin sheet after infrared irradiation under a condition where the resin sheet is supported as shown in FIG. 1.

When as shown in FIG. 1, the resin sheet is irradiated with infrared rays, as shown in FIG. 2, print portions 4 of the high-density infrared absorbing ink, i.e., the regions A, are most thinned to become depressions, and portions 5 of the low-density infrared absorbing ink become thicker than the print portions 4 but thinner than color ink print portions 6, and become projections with respect to the print portions 4. Further, the color ink print portions 6 become thickest and thus become highest projections.

When the resin sheet having non-print portions instead of the color ink print portions 6, portions of the high-density infrared absorbing ink become depressions, portions of the low-density infrared absorbing ink become low projections, and the non-print portions become highest projections (not shown).

This relative thinning and thickening occurs to produce projections and depressions.

The projections and depressions are formed evenly on both surfaces of the resin sheet as shown in FIG. 2. Therefore, projections and depressions are also produced on a surface of the resin sheet in contact with the injection molding resin.

A difference in height of the projections and depressions can be measured with a surface roughness meter or a thickness meter, projections and depressions can be visually and tactilely recognized as an expression if a difference (hereinafter referred to as a "difference in thickness") between the highest portion and the lowest portion of surface projections and depressions is about 10 μm. In order to express distinct projections and depressions, the difference in thickness is preferably about 15 μm and more preferably 20 μm or more. On the other hand, since the difference in thickness decreases in proportion to expansion magnification, the difference in thickness of projections and depressions tends to decrease as the product is more deeply molded. In addition, the width of each of the projections and depressions tends to increase as the expansion magnification increases.

In the present invention, the pattern expressed by projections and depressions is not particularly limited, and also the thickness, size, shape, etc. of a drawing which expresses a pattern such as a figure, a character, or the like are not particularly limited. That is, in the present invention, projections and depressions can be expressed by printing, handwriting, or the like in any one of the methods (1) to (3), and thus any projections and depressions can be realized as long as they form a figure or character for which a plate can be made or which can be printed.

Examples of the pattern include drawings expressed by stippling or line drawing (specifically, contours of a picture and a character, wood grains, stripes, a hairline pattern, and the like), dot and geometric patterns, and characters and marks. When it is desired to emboss a pattern, the pattern preferably has as a small area as possible. Of course, the present invention is not limited to these patterns, and any figured patterns such as figures, characters, and the like can be expressed.

FIGS. 3 to 6 show examples of a pattern expressed by projections and depressions in the present invention. In these figures, pattern portions printed with an infrared absorbing ink or infrared reflecting ink are blacked. FIG. 3 shows a stripe pattern, FIG. 4 shows a dot pattern, FIG. 5 shows a geometric pattern, and FIG. 6 shows a wood-grain pattern.

(Surface Temperature)

In the present invention, "the surface temperatures of the region A and the region B" are measured with "Thermotracer 9100" manufactured by NEC/Avio Corporation.

As described above, the region A and the region B of the resin sheet are estimated to cause thermal behaviors under a condition in which the temperature is uniformly applied to not only the surfaces of the region A and the region B but also the insides thereof. However, there is no method for measuring an internal temperature, and thus in the present invention, the surface temperatures of the region A and the region B are defined as an index which indicates the thermal behaviors.

(Heat-Shrinkable Resin Sheet)

The heat-shrinkable resin sheet (hereinafter, abbreviated as the "resin sheet S") used in the present invention is composed of a resin which exhibits extensibility by heating and can be formed into a film, and further has an inflection point of orientation returning strength. Further, when the resin sheet is pre-formed before being placed in the injection mold, the resin sheet is preferably a thermoplastic resin sheet because of its good extensibility.

In the present invention, the inflection point temperature of orientation returning strength is the temperature of a film when heat is applied to the film from the outside, and when the film reaches the temperature, stretched molecules are started to shrink to shrink the whole film. In the present invention, the inflection point temperature T of orientation returning strength is defined by a method described below.

The orientation returning strength used in the present invention is measured according to ASTM D-1504. The term "orientation returning strength" represents a force exhibited by restoration of the stretched sheet to a state before stretching when the sheet is heated. The force can be determined as a value obtained by dividing the maximum stress by the sectional area of the sheet at each measurement temperature, and can be used as an index which indicates the degree of molecular orientation of the stretched sheet. In the present invention, the inflection point temperature T is determined at a convex point of an upward-slopping graph showing a relationship between orientation returning strength and heating temperature measured by the thermal shrinkage-stress measurement method. When there are a plurality of inflection points as convex points, the inflection point temperature in the highest temperature region is regarded as the inflection point temperature T of orientation returning strength.

Specifically, a heater temperature is increased in 5° C. increments using a D. N-type stress tester manufactured by Nichiri Kogyo Co., Ltd. at a voltage regulation scale of 6, measuring orientation returning stress at each measurement temperature. After shrinkage stress is exhibited, the inflection point temperature T is determined from a graph showing a relationship between orientation returning strength and heating temperature. An example of this measurement is shown in FIG. 7. FIG. 7 is a graph obtained by measuring a biaxially oriented PET sheet "Softshine X1130 (thickness 125 μm)" manufactured by Toyobo Co., Ltd. (sheet S1 in Examples). The inflection point temperature of 188° C. at a convex point in the highest temperature region of the graph is regarded as the inflection point temperature T of orientation returning strength of the sheet S1.

As described above, the resin sheet having the inflection point of orientation returning strength is generally subjected to stretching treatment, and the stretching method generally includes melt-extruding a resin by an extrusion film forming method to form a sheet and then performing uniaxial stretching, simultaneous biaxial stretching, or sequential biaxial stretching. In the case of sequential biaxial stretching, generally, longitudinal stretching is first performed, and then transverse stretching is performed. Specifically, a method of combining longitudinal stretching using a speed difference between rolls and transverse stretching using a tenter is often used.

The tenter method has the merit of producing a wide product and exhibiting high productivity. Although the magnification is not particularly limited because stretching conditions vary according to resin plasticity and the intended physical properties and moldability, the area magnification is generally 1.2 to 18 times and more preferably 2.0 to 15 times. In the case of sequential stretching, the stretch magnification in the machine direction is 1.2 to 5 times and preferably 1.5 to 4 times, and the stretch magnification in a direction crossing the machine direction is 1.1 to 5 times and preferably 1.5 to 4.5 times. In the case of simultaneous biaxial stretching, the stretch magnification in each of the directions is 1.1 to 3.5 times and preferably 1.2 to 4.2 times.

Specifically, a stretched sheet such as a uniaxially stretched sheet or a biaxially oriented sheet can be used, but the biaxially oriented sheet is preferred because the advantages of the present invention can be maximized. In addition, a simultaneously biaxially oriented sheet has a uniform in-plane shrinkage ratio, and thus a concave-convex design with no distortion can be formed. However, a uniaxially stretched or sequentially biaxially oriented sheet may be used by previously calculating distortion.

The resin used is not particularly limited as long as it is stretchable, and examples of a usable resin include polyester resins such as polyethylene terephthalate, polybutylene terephthalate, and the like; polyolefin resins such as polyethylene, polypropylene, and the like; polyvinyl chloride; acryl resins; polystyrene resins; nylon; vinylon; and the like. In particular, the polyester resins are preferred because of good uniformity of thickness after stretching.

The thickness of the resin sheet S is not particularly limited as long as the thickness is usually used for thermoforming sheets used for vacuum forming. In general, the sheet having a thickness of about 0.1 mm to 0.5 mm is preferably used.

In order to irradiate the resin sheet with infrared rays so that the surface temperatures of the region A and the region B are different from each other, and the surface temperature of at least the region A is equal to or higher than the orientation release stress inflection point temperature T of the resin sheet, the above-described methods (1) to (3) using the infrared absorbing ink or infrared reflecting ink can be used.

(Infrared Absorbing Ink or Infrared Reflecting Ink)

The infrared absorbing ink or infrared reflecting ink used in the methods (1) to (3) is described.

The infrared absorbing ink is an ink containing an infrared absorber, and the infrared reflecting ink is an ink containing an infrared reflecting substance. Both inks are used for security inks and the like.

As described above, the infrared absorbing ink generates heat by absorbing the infrared rays applied. That is, when the resin sheet printed with the infrared absorbing ink is irradiated with infrared rays, heat in an amount larger than that applied by infrared irradiation is applied to only a portion printed with the infrared absorbing ink. On the other hand, the infrared reflecting ink is an ink containing an infrared reflecting substance and reflects the infrared rays applied. When the resin sheet printed with the infrared reflecting ink is irradiated with infrared rays from the resin sheet side (i.e., the side opposite to the print surface of the resin sheet), the infrared rays transmitted through the resin sheet are reflected by the infrared reflecting ink, and thus heat in an amount larger than that applied by infrared irradiation is applied only to a print portion where the infrared rays are transmitted and reflected. That is, heat in an amount larger than that applied by infrared irradiation is applied only to a region printed with the infrared absorbing ink or infrared reflecting ink, and thus the surface temperature of such a region can be increased, resulting in the occurrence of a temperature difference between a region printed with the infrared absorbing ink and a region not printed with the ink in the resin sheet.

In the present invention, the temperature of the resin sheet S is increased by infrared irradiation to create an elastic region suitable for thermoforming. In this case, when a region provided with the infrared absorbing ink or infrared reflecting ink is present in the resin sheet, heat is further applied to produce projections and depressions, but it is preferred that the surface temperature of the region A (region having a relatively high surface temperature) is equal to or higher than the orientation release stress inflection point temperature T of the resin sheet S. Further, a temperature difference between the region A and the region B is preferably 7° C. or more, and more preferably 10° C. or more and still more preferably 15° C. or more because deeper projections and depressions can be imparted.

The infrared irradiation may be performed so that the surface temperature of only the region A is equal to or higher than the inflection point temperature T of orientation returning strength or the surface temperatures of both the region A and the region B are equal to or higher than the inflection point temperature T of orientation returning strength. In the latter case, deeper projections and depressions can be formed.

As the infrared absorbing ink, a material generally commercially available as an infrared absorber or an ink containing any one of various known infrared absorbing pigment or dyes which have the function to generate heat by absorbing wavelengths in the red to near-infrared and infrared laser region can be preferably used. Examples of the infrared absorber include pigments and dyes such as insoluble azo pigments, azo lake pigments, condensed azo pigments, chelate azo pigments, phthalocyanine pigments, anthraquinone pigments, perylene and perinone pigments, thioindigo pigments, quinacridone pigments, dioxazine pigments, isoindolinone pigments, guinophthalone pigments, dye lake pigments, azine pigments, nitroso pigments, nitro pigments, natural pigments, fluorescent pigments, inorganic pigments, carbon black, azo dyes, metal complex salt azo dyes, pyrazolone azo dyes, anthraquinone dyes, phthalocyanine dyes, carbonium dyes, quinoneimine dyes, methine dyes, cyanine dyes, carbon black, titanium black, titanium oxide, Cu—Cr-based compound oxides, phthalocyanine, naphthalocyanine, cyanine, and the like; polymethine pigments and dyes; red absorbers such as squarylium dyes; near-infrared absorbers; infrared absorbers, and the like.

Examples of the infrared reflecting material contained in the infrared reflecting ink include metals such as aluminum, gold, silver, copper, brass, titanium, chromium, nickel, nickel chromium, stainless steel, and the like; Fe—Cr-based compound oxides; antimony trioxide; antimony dichromate; and the like.

The particle diameter of the infrared absorber and the infrared reflecting material is not particularly limited, and any particle diameter within a range usually used for inks can be used without any problem.

On the other hand, the amount of heat applied to the region A increases as the ink density increases. Therefore, the ink content is preferably appropriately changed according to the desired degree of projections and depressions. While an excessively low ink density causes an excessively small amount of heat generated by infrared irradiation and an excessively small amount of infrared rays reflected, thereby failing to form depressions. An excessively high ink density causes an excessively large amount of heat generated and an excessively large amount of infrared rays reflected, thereby causing breakage, holes, or the like. Therefore, as described below, it is necessary to appropriately adjust the ink density so that elastic modulus is more than 0.5 MPa during molding.

Also, an ink varnish is not particularly limited, and a known resin for varnish can be used. Examples of the resin for varnish include acryl resins, polyurethane resins, polyester resins, vinyl resins (vinyl chloride, vinyl acetate, and vinyl chloride-vinyl acetate copolymer resins), chlorinated olefin resins, ethylene-acryl resins, petroleum resins, cellulose derivative resins, and the like. Thus, known inks can be used.

In the methods (1) to (3), handwriting, coating, and printing can be used as the method for providing a pattern on the resin sheet S with the infrared absorbing ink or infrared reflecting ink, but printing is industrially preferred. Examples of the method include, but are not particularly limited to, gravure printing, offset printing, screen printing, ink jet printing, brush coating, roll coating, comma coating, rod gravure coating, micro gravure coating, and the like. Among these methods, the gravure printing method and the screen printing method are preferred.

In the method (1), heat in an amount larger than that applied by infrared irradiation is applied to the region A provided with the pattern with the infrared absorbing ink or infrared reflecting ink, and thus the surface temperature is relatively increased, thereby forming a depression. On the other hand, only the heat of infrared irradiation is applied to the region B not provided with the pattern, and thus the surface temperature is relatively lower than that of the region A, thereby forming a projection.

In the method (2), heat in an amount larger than that applied by infrared irradiation is applied to both the region A and the region B, but the amount of heat applied to the region A is larger than that of the region B as a result of the higher ink density in the region A than that in the region B. Therefore, the surface temperature of the region A is relatively higher than that of the region B, and thus the region A becomes a depression and the region B becomes a projection.

Specifically, the method (2) is capable of adjusting the ink density by using inks of different densities for providing the region A and region B or using a kind of ink and adjusting the amount of the ink put down so that the amount of the ink put down on the region A is larger than that on the region B.

In addition, the number of the region A need not be 1, and, for example, when three types of inks having different densities are used, a portion using the ink with the lowest density is the region B as a projection, and a portion using the ink with the highest density is a region A" as a depression. Of course, the number of the region A can be adjusted by the amount of ink put down.

In the method (3), heat in an amount larger than that applied by infrared irradiation is applied to both the region A and the region B, but the amount of heat applied to the region A is larger than that of the region B as a result of the higher infrared absorptance or reflectance of the ink provided in the region A than that in the region B. Therefore, the surface temperature of the region A is relatively higher than that of the region B, and thus the region A becomes a depression, and the region B becomes a projection.

The absorptance of the infrared absorbing ink or the reflectance of the infrared reflecting ink cannot be generally compared, but as a rough standard, when an infrared reflecting ink containing aluminum and an infrared absorbing ink containing carbon black are used in combination, the ink containing aluminum forms a depression, and the ink containing carbon black forms a projection. In addition, when an infrared absorbing ink containing carbon black and an infrared absorbing ink containing titanium oxide are used in combination, the ink containing carbon black forms a depression, and the ink containing titanium oxide forms a projection.

Therefore, specifically, when the region A is printed with an ink containing aluminum and the region B is printed with an ink containing carbon black, the region A becomes a depression, and the region B becomes a projection. In addition, when the region A is printed with an ink containing carbon black and the region B is printed with an ink containing titanium oxide, the region A becomes a depression, and the region B becomes a projection. Therefore, the heat generating substance can be appropriately selected in consideration of a desired concave-convex design and a pattern design with visibility.

The methods (1) to (3) may be used in combination. For example, when the resin sheet S is printed with the infrared absorbing ink so that a single-plate print portion, a multiple-plate print portion, and a non-printed portion are provided, projections and depressions can be produced in such a manner that the multiple-plate print portion becomes a deepest depression, the single-plate print portion becomes a projection with respect to the multiple-plate print portion and a depression with respect to the non-print portion, and the non-print portion becomes a projection.

In addition, in the case of printing with the infrared absorbing inks having a low density and a high density so as to provide a non-printed portion, projections and depressions can be produced in such a manner that a high-density ink print portion becomes a deepest depression, a low-density ink print portion becomes a projection with respect to the high-density ink print portion and a depression with respect to the non-print portion, and the non-print portion becomes a projection.

(Other Print Layers)

When projections and depressions are conformed to portions of patterned design having visibility, colored carbon black or aluminum ink may be used as the infrared absorbing ink or infrared reflecting ink. In addition, the infrared absorbing ink or infrared reflecting ink may contain a general-purpose coloring material. In this case, the infrared absorber or the infrared reflecting material having high transparency is preferably used because it can make the best use of the general-purpose coloring agent. Further, another picture layer may be provided with an ink containing the general-purpose coloring agent using a different plate. In this case, the coloring agent used is not particularly limited, but the mixing ratio is preferably appropriately changed according to the purpose because a coloring material having heat absorbability can provide projections and depressions in print portions.

On the other hand, when the plate of the infrared absorbing ink or infrared reflecting ink is changed to a plate of an ink containing a general-purpose coloring material which does not absorb or reflect infrared rays, projections and depressions not conforming to a pattern can be provided.

Further, when the resin S is separated after being integrated with the injection molding resin to produce the injection-molded product having a concave-convex patterned surface, a transfer pattern can be previously provided on the sheet. In this case, a coloring material pattern is transferred to the injection-molded product by separating the resin sheet S after injection molding. Therefore, the injection-molded product having the transferred pattern and projection and depressions can be produced.

When the transfer pattern is provided, a pattern layer is provided on the side opposite to the side in contact with the mold, i.e., the side in contact with the injection molding resin. Further, when the infrared absorbing ink or infrared reflecting ink is disposed on the side in contact with the mold, projections and depressions not conforming to the pattern can be provided.

(Other Desired Layers)

In addition, layers other than the resin sheet may be provided within a range where the effects of the present invention are not impaired. The other layers include a surface protecting layer for protecting a surface of the resultant injection-molded product or for imparting characteristics such as abrasion resistance, scratch resistance, weather resistance, contamination resistance, water resistance, chemical resistance, or heat resistance, an adhesive layer or sticky layer for more strongly bonding the resin sheet S to the injection molding resin, a mold release layer for separating the resin sheet to produce the injection-molded product having a concave-convex patterned surface, and the like.

The surface protecting layer may be a resin layer exhibiting plasticity at a temperature higher than that of the resin sheet S but preferably has flexibility so that it can follow to some extent a thickness difference between the region A and the region B. From this viewpoint, a methacryl resin layer having a high glass transition temperature and a surface protecting layer partially crosslinked so as not to impair extensibility are preferred. The crosslinking mode is not particularly limited, and crosslinking may be effected by using existing reaction such as heat curing reaction between isocyanate and hydroxyl groups, heat curing reaction between epoxy groups and hydroxyl groups, UV or heat curing reaction using radical polymerization reaction of (meth)acryloyl groups, or hydrolysis condensation reaction of silanol groups or hydrolyzable silyl groups, or the like. However, the heat curing reaction between isocyanate and hydroxyl groups is preferred because crosslinking reaction can be promoted by the heat applied during heat molding. The surface protecting layer is preferably transparent, semi-transparent, or colored and clear so that the convex-concave pattern (deep feel) imparted can be recognized.

When the resin sheet S is separated to produce the injection-molded product having a concave-convex patterned surface, the surface protecting layer is preferably disposed between a mold release layer described below and the pattern print layer to be transferred. This allows the print layer to be disposed below the surface protecting layer, thereby protecting the pattern of the resultant injection-molded product. Specifically, the resin sheet S, the mold release layer, the transparent resin cured layer, the pattern print layer to be transferred, and the adhesive layer are preferably laminated in that order. In this case, when the infrared absorbing ink or infrared reflecting ink layer is also desired to be transferred to a surface of the injection-molded product, the resin sheet S, the mold release layer, the transparent resin cured layer, the pattern print layer and the infrared absorbing ink or infrared reflecting ink layer to be transferred, and the adhesive layer are preferably laminated in that order.

(Adhesive Layer)

The adhesive layer or sticky layer generally used for heat transfer sheets may be provided for the purpose of enhancing adhesion between the ink layer and the injection-molded product.

The adhesive layer must be selected according to the type of the injection molding resin because the adhesive layer is arbitrarily used for satisfactorily bonding an ink to the injection molding resin. Examples of a general adhesive include acryl resins, urethane resins, urethane-modified polyester resins, polyester resins, epoxy resins, ethylene-vinyl acetate copolymer resins (EVA), vinyl chloride resins, vinyl chloride-vinyl acetate copolymer resins, natural rubber, synthetic rubbers such as SBR, NBR, silicone rubber, and the like. Either a solvent type or a solventless type can be used.

(Mold Release Layer)

When the resin sheet S is separated after being integrated with the injection molding resin to produce the injection-molded product having a concave-convex patterned surface, the mold release layer is provided on the resin sheet S so that the surface protecting layer and an ink containing the heat generating substance can be easily transferred to the injection-molded product. The mold release layer is separated together with the resin sheet S when the resin sheet S is separated. Examples which can be used as a material for the mold release layer include an epoxy resin-based mold release agent, an epoxy melamine resin-based mold release agent, an aminoalkyd resin-based mold release agent, a melamine resin-based mold release agent, a silicone resin-based mold release agent, a fluorocarbon resin-based mold release agent, a cellulose derivative-based mold release agent, a urea resin-based mold release agent, a polyolefin resin-based mold release agent, a paraffin-based mold release agent, and a composite mold release agent composed of two or more of these agents. The mold release layer can further contain a fine powder of calcium carbonate, silica, zinc oxide, magnesium carbonate, polyethylene wax, glass beads, or the like in order to permit the expression of a mat feel.

As a method for forming the mold release layer, various printing methods and coating methods can be preferably used.

(Thickness)

The thickness of the resin sheet S used in the present invention is not particularly limited as long as the total thickness including the infrared absorbing ink or infrared reflecting ink layer and the other layers is generally used for thermoforming sheets for vacuum forming.

(Production Method)

The method for producing the injection-molded product of the present invention includes, before the resin sheet S is placed in the injection mold or after placed in the injection mold and before integrated with the resin, the step of irradiating the resin sheet S with infrared rays so that the surface temperatures of the region A and the region B are different from each other, and the surface temperature of at least the region A is equal to or higher than the orientation release stress inflection point temperature T of the resin sheet S, thereby producing a thickness difference between the region A and the region B.

(Molding Machine)

The molding machine used in the present invention may be a general-purpose injection molding machine, but when the resin sheet S is irradiated with infrared rays after being placed in the injection mold and before the integration step, an apparatus including a film supply device and a preheating device which are provided near the mold of the injection molding machine can be preferably used. Specifically, the injection molding machine is of a thermoject type in which a heat source of the preheating device includes an infrared irradiation device which emits a wavelength in the near-infrared and mid-infrared region described below.

When the resin sheet S is irradiated with infrared rays, the resin sheet S is preferably supported. The supported state refers to a state where part or the whole of the periphery of the resin sheet S is fixed, i.e., a state where in the resin sheet S, a surface in contact with the injection molding resin is not supported by a substrate. Specifically, a method for fixing a portion of the resin sheet S by clamping or a method for mixing the whole periphery of the resin sheet S with a frame clamp can be used. However, the method for fixing the whole periphery of the sheet by clamping with a frame clamp is preferred because tension of the resin sheet S can be optimized (equalized).

The fixing can also be performed by preventing plasticization and shrinkage of the resin sheet S other than the method of clamping with a jig such as a frame-shape clamp or the like. Specifically, a portion of the resin sheet S other than the portion in contact with the injection molding resin, preferably the peripheral portion of the sheet, is kept at a temperature equal to or lower than the glass transition temperature (may be referred to as "Tg" hereinafter) so that fixing can be performed by preventing plasticization.

(Infrared Irradiation)

Before the resin sheet S is placed in the injection mold or after placed in the injection mold and before the integration step, the resin sheet S is irradiated with infrared rays so that the surface temperature of at least the region A is equal to or higher than the orientation release stress inflection point temperature T of the resin sheet, thereby heating the region A and the region B to have different surface temperatures. As a result, a thickness difference occurs between the region A and the region B.

In this case, the infrared rays used are not particularly limited as long as they fall in the wavelength region of red to near-infrared and infrared laser light. The upper limit of the amount of infrared irradiation is not particularly limited, but the application of an excessively large amount of heat decreases rigidity of the resin sheet S and accelerates plasticization, thereby causing a trouble in molding due to breakage or the like. Therefore, the irradiation amount is preferably determined so that a portion at the highest temperature in the resin sheet S used shows 0.5 MPa or more, more preferably 1 MPa or more, in terms of a value of storage modulus (E') determined by dynamic viscoelasticity measurement according to JIS K7244-1 method.

Since the infrared irradiation device for heating the sheet is required to emit a wavelength which can be absorbed by only the heat generating substance, it is preferred to use a halogen heater, a short-wavelength heater, a carbon heater, a mid-infrared heater or the like, which has a strong wavelength peak in the mid to near-infrared region. The peak of the main wavelengths of the infrared irradiation device is preferably within the range of 1.0 to 3.5 µm, and more preferably within the range of 1.5 to 3.0 µm from the viewpoint that a thickness difference can be efficiently created, and high-efficiency production can be realized without causing an excessive temperature difference between the heat absorbing material and other portions.

The infrared irradiation device installed as a heating device is often a temperature control device. Therefore, in the present invention, the amount of infrared irradiation is not directly evaluated but is evaluated from the surface temperatures of the region A and the region B of the resin sheet S as a result of infrared irradiation.

The minimum amount of infrared irradiation is set so that the surface temperature of at least the region A of the resin sheet S is equal to or higher than the orientation release stress inflection point temperature T of the resin sheet S. On the other hand, when the temperature of the region A is excessively high, plasticization in the region A proceeds, and thus defects such as holes or the like may occur. Therefore, the maximum amount of infrared irradiation is preferably determined so that E' of the region A measured by the dynamic viscoelasticity method is 0.5 MPa or more and more preferably 1.0 MPa or less.

When infrared irradiation is performed before the resin sheet S is placed in the injection mold, infrared irradiation even under the atmospheric pressure has no problem, but infrared irradiation under vacuum is preferred because projections and depression can be efficiently expressed. Although vacuum molding is generally performed by infrared irradiation heating under the atmospheric pressure, in the present invention, it was found that a larger difference in thickness can be effectively expressed by infrared irradiation under a vacuum condition at the same temperature. This is estimated to be due to the fact that infrared ray wavelengths efficiently reach the resin sheet S and the ink without being affected by atmospheric heat conduction. Conversely, it is estimated that excess heat is not easily transmitted to the region A and the region B because substantially no surrounding humidified air is present.

Then, if required, preform molding may be performed. As a preform molding method, for example, existing thermal molding methods such as a hot-plate molding method, a vacuum molding method, an ultra-high pressure molding method, a compressed-air molding method, a compressed-air vacuum molding method, and the like can be used. From the viewpoint that projections and depressions can be efficiently expressed, an indirect heating method using radiant heat from a heater which emits a wavelength in the near-infrared and mid-infrared region is preferably used as a heating method for these molding methods. Among these methods, the compression-air vacuum molding method is preferably used.

As a mold for the preform, a mold made of a metal such as stainless steel or silicon is preferably used because the easy removal. In addition, the shape of the mold is not particularly limited, and the mold with a plate shape or a three-dimensional shape can be used.

If required, an unnecessary portion is then trimmed. The trimming method is not particularly limited, and trimming can be performed by a method of cutting with a cutter, a die cutting method, a laser cutting method, a water jet method, or a punch press method.

On the other hand, when infrared irradiation is performed after the resin sheet S is placed in the injection mold, it is preferred to use a thermoject type injection molding machine in which the heat source of the preheating device is an infrared irradiation device described below which emits a wavelength in the near-infrared and mid-infrared region.

(Injection-Molded Product)

The resin sheet S is irradiated with infrared rays to produce projections and depressions before being placed in the injection mold, and then placed in the injection mold for injection molding. On the other hand, when the resin sheet S is irradiated with infrared rays after being placed in the injection mold, the resin sheet S is placed so as to be supported in the injection mold and then irradiated with infrared rays after the injection mold is closed, thereby producing a thickness difference between the region A and the region B. In this state, the resin sheet is clamped in the mold, and the injection molding resin is injected.

(Injection Molding Resin)

The resin used for injection molding is not particularly limited, and known injection molding resins can be used. Examples thereof ABS-based polymer alloys such as ABS resins, PVC (polyvinyl chloride)/ABS resins, PA (polyamide)/ABS resins, PC (polycarbonate)/ABS resins, PBT (polybutyleneterephthalate)/ABS resins, and the like; AAS (acrylonitrile/acryl rubber/styrene) resins, AS (acrylonitrile/styrene) resins, AES (acrylonitrile/ethylene rubber/styrene) resins, MS ((meth)acrylate/styrene) resins, PC resins, PMMA (polymethyl methacrylate) resins, PP (polypropylene) resins, and the like.

In addition, an inorganic filler can be added to the injection molding resin in order to prevent deformation during or after molding. Examples of the inorganic filler include, but are not particularly limited to, talc, calcium carbonate, clay, diatomaceous earth, mica, magnesium silicate, silica, and the like.

Further, commonly used additives may be added in a range where moldability is not impaired. Examples of the additives which may be added include a plasticizer, light-resistant additives (an ultraviolet absorber, a stabilizer, and the like), an antioxidant, an antiozonant, an activator, an antistatic agent, a lubricant, an anti-abrasion agent, a surface adjustors (a leveling agent, a defoaming agent, an anti-blocking agent, and the like), a fungicidal agent, an antibacterial agent, a dispersant, a flame retardant, a vulcanization accelerator, and a vulcanization acceleration aid. These additives may be used alone or in combination of two or more.

Further, a colorant may be added to the injection molding resin. The amount of the colorant added depends on the type of the colorant and the intended color tone, but is preferably 30 parts by mass or less and more preferably 20 parts by mass or less relative to 100 parts by mass of the injection molding resin.

The colorant used is not particularly limited, and commonly used inorganic pigments and organic pigments and dyes which are used for coloring general thermoplastic resins can be used. Examples thereof include inorganic pigments such as titanium oxide, titanium yellow, iron oxide, compound oxide-based pigments, ultramarine blue, cobalt blue, chromium oxide, bismuth vanadate, carbon black, zinc oxide, calcium carbonate, barium sulfate, silica, talc, and the like; organic pigments such as azo pigments, phthalocyanine pigments, quinacridone pigments, dioxazine pigments, anthraquinone pigments, isoindolinone pigments, isoindoline pigments, perylene pigments, perynone pigments, quinophthalone pigments, thioindigo pigments, diketopyrrolopyrrole pigments, and the like; and metal complex pigments. In addition, at least one dye mainly selected from the group of oil-soluble dyes is preferably used as a dye.

The injection molding conditions are not particularly limited and the injection conditions and the mold temperature may be determined according to the injection molding resin. However, the mold temperature is preferably lower than the orientation release stress inflection point temperature T of the resin sheet S.

The mold temperature for insert-molding a polypropylene resin or ABS resin may be adjusted so that the temperatures of both the cavity-side mold and the core-side mold are water-cooling temperature to about 100° C. However, warping may occur after insert molding according to the shape of the transfer member. In this case, the mold temperature may be adjusted to provide a temperature difference between the cavity-side mold and the core-side mold. In addition, an injection delay time may be provided to maintain a decorative sheet inserted into the clamped mold for a time within the range of 1 to 100 seconds in order to heat the sheet up to the mold temperature before charging of the injection molding resin.

The temperature of the injection molding resin is not particularly limited, but the temperature of the thermoplastic resin such as a polypropylene resin or an ABS resin is preferably about 180° C. to 250° C. which permits injection. The temperatures of both the male mold and the female mold are preferably about 20 to 80° C., but when warping occurs in the injection-molded product, the warping is required to be corrected by providing a temperature gradient on the male mold and the female mold.

The injection-molded product produced as described above has a smooth surface but has a visible concave-convex pattern (depth feel) and is excellent in depth feel. As described above, the projections and depressions are produced by a difference in surface temperature between the adjacent region A and region B present in the same plane of the resin sheet S. In the methods (1) to (3) for providing the above-described surface temperatures, a colored carbon black ink is used as the infrared absorbing ink or infrared reflecting ink or colored inks are mixed or overprinted to provide a visible concave-convex pattern which conforms to a print pattern.

In order to provide the visible concave-convex pattern, the resin sheet S preferably has transparency. Specifically, as a result of investigation of a relation between the haze value of the resin sheet S and the depth feel of the visible concave-convex pattern, the depth feel slightly varies with a height difference of projections and depressions and the color and transparency of the injection molding resin, but the depth feel can be improved with the resin sheet S having a haze value of less than 60%. The haze value is preferably less than 40% because the visible concave-convex pattern can be more clearly recognized, and more preferably less than 5% because a distinct depth feel can be imparted.

On the other hand, the resin sheet S may be separated from the resultant injection-molded product to transfer projections and depressions having a height difference which can be sufficiently felt visually and tactilely. As described above, when the resin sheet S has a transfer pattern, the injection-molded product having the transferred pattern and projections and depressions can be produced.

The separation method is not particularly limited, but separation is preferably performed under a condition in which the sheet after pattern transfer can be separated directly from the molded product when the mold is opened. When the sheet is hard to separate, for example, an end surface at the boundary may be raised and then pulled off. When the boundary end surface is hard to raise, an adhesive tape may be attached to form a peel end, and then the end may be pulled off. When the resin sheet S and the injection molding resin are of the same type, bonding occurs due to heat fusion, thereby causing difficulty in separation. When separation is made difficult by strong bonding, the above-described mold release layer is preferably provided on the resin sheet S on the side in contact with the injection molding resin.

EXAMPLES

The present invention is described below with reference to examples. "Parts" and "%" are on a mass basis unless otherwise specified.

(Resin Sheet S)

As the resin sheet S, the following five sheets were used.

Sheet S0: biaxially oriented PET sheet "Softshine X1130" (thickness 188 μm) manufactured by Toyobo Co., Ltd.

Sheet S1: biaxially oriented PET sheet "Softshine X1130" (thickness 125 μm) manufactured by Toyobo Co., Ltd.

Sheet S2: biaxially oriented PET sheet "reflex FT3NC3" (thickness 50 μm) manufactured by Teijin DuPont Films Co., Ltd.

Sheet S3: biaxially oriented polystyrene sheet (thickness 250 μm) "Polystyrene CR-4500 manufactured by DIC Corporation was extruded at 210° C. with an extruder, and then a non-oriented original film was formed from a T die. Then, the film was stretched under a temperature condition of 130° C. to form a stretched sheet having a thickness of 250 μm and a heat-shrinkage stress of 0.4 Mpa in the MD direction and 0.5 Mpa in the TD direction."

Sheet S4: biaxially oriented PS sheet "OPS-210 grade" (thickness 250 μm) manufactured by Sundic Inc.

Sheet S5: non-stretched sheet "A-PET PT700M" (thickness 250 μm) manufactured by Polytech Corp.

In addition, as an insert film or an embossed sheet for comparison, the following films were used.

Insert film: heat-transfer detachable film OPET sheet "T9116-05" (thickness 52 μm) manufactured by Nihon Decoall Corporation and having a transfer layer including a hairline transfer print layer and a top coat layer, the top coat layer being UV cured after transfer to an adherend.

Embossed sheet: embossed decorative sheet (previously imparted with projections and depressions with a heat roll) "Sunny Cross-05E (thickness 140 μm) manufacture by Nihon Decoall Corporation (Haze Value)

The haze of a laminated portion of the resin sheet S and the adhesive layer was measured by selecting test method 3 of JIS-K7136 using haze meter NDH2000 manufactured by Nippon Denshoku Industries Co., Ltd. The haze value of each of the sheets was as follows.

Haze value of sheet S0: 1.1
Haze value of sheet S1: 1.0
Haze value of sheet S2: 15.5
Haze value of sheet S3: 1.0
Haze value of sheet S4: 1.7

(Method for Measuring Inflection Point Temperature T of Orientation Returning Strength)

The orientation release stress inflection point temperature T of the resin sheet S was determined as follows. The heater temperature was increased in 5° C. increments using a D.N-type stress tester manufactured by Nichiri Kogyo Co., Ltd. at a voltage regulation scale of 6 to measure orientation returning stress at each measurement temperature, thereby reading the inflection point temperature T of orientation returning strength.

Results

Inflection point temperature T of orientation returning strength of sheet S0: 188° C.

Inflection point temperature T of orientation returning strength of sheet S1: 188° C.

Inflection point temperature T of orientation returning strength of sheet S2: 170° C.

Inflection point temperature T of orientation returning strength of sheet S3: 109° C.

Inflection point temperature T of orientation returning strength of sheet S4: 109° C.

Inflection point temperature T of orientation returning strength of sheet S5: No (Infrared Absorbing Ink or Infrared Reflecting Ink)

As the infrared absorbing ink or infrared reflecting ink and the color ink, the following inks were used.

Ink P1: "Paint Marker" Black manufactured by Mitsubishi Pencil Co., Ltd. which was used as the infrared absorbing ink Ink P2: "Paint Marker" Silver manufactured by Mitsubishi Pencil Co., Ltd. which was used as the infrared reflecting ink Ink P3: "Paint Marker" Blue manufactured by Mitsubishi Pencil Co., Ltd. which was used as the color ink Ink G1: gravure printing ink "NH-NT" Black manufactured by DIC Graphics Corporation which was used as the infrared absorbing ink containing carbon black Ink G2: gravure printing ink "NH-NT" Silver manufactured by DIC Graphics Corporation which was used as the infrared reflecting ink containing aluminum paste Ink G4: gravure printing ink "XS-756" Black manufactured by DIC Corporation which was used as the infrared absorbing ink containing 40% by mass of carbon black relative to the total solid content Ink G5: gravure printing ink "XS-756" Silver manufactured by DIC Corporation which was used as the infrared reflecting ink containing 13% by mass of aluminum paste relative to the total solid content Ink G6: gravure printing ink "NH-NT (A)" White manufactured by DIC Graphics Corporation which was used as the infrared absorbing ink containing 50% by mass of titanium oxide relative to the total solid content With respect to the ink G1 and the ink G2, the surface temperature with the ink G2 is higher than that with the ink G1.

Ink GH1: gravure printing ink "XS-756" Red manufactured by DIC Corporation which was used as the color ink Ink GH2: gravure printing ink "XS-756" Blue manufactured by DIC Corporation which was used as the color ink Ink GH3: gravure printing ink "XS-756" Yellow manufactured by DIC Corporation which was used as the color ink Ink GH4: gravure printing ink "XS-756" Pearl manufactured by DIC Corporation which was used as the color ink Ink GH5: gravure printing ink "NH-NT" Red manufactured by DIC Graphics Corporation which was used as the color ink Ink GH6: gravure printing ink "NH-NT" Blue manufactured by DIC Graphics Corporation which was used as the color ink Ink GH7: gravure printing ink "NH-NT" Yellow manufactured by DIC Graphics Corporation which was used as the color ink (Confirmation of Expression of Thickness Difference in Step (1))

Any one of the sheets S1 to S3 was used as the resin sheet S, and a straight line with a width of 2 mm was drawn on the sheet S in the machine direction (MD) and the cross direction (CD) using any one of the inks P1 to P3. Then, under a condition where the periphery of the resin sheet was completely fixed with a clamp, the resin sheet S was heated indirectly from the side opposite to the side on which the line was drawn under vacuum using "NGF-0709 molding machine" manufactured by Fu-se Vacuum Forming and a mid-infrared heater manufactured by Helius Corporation as a heater.

After it was confirmed by FT-H30 radiation thermometer manufactured by Keyence Corporation that the surface temperature of the resin sheet S was increased to the heater set temperature, the resin sheet S was cooled to normal temperature and removed from the clamp to prepare a sample.

With respect to the surface temperatures of the region A printed with the ink and the region B not printed with the ink, Thermotracer TH9100 manufactured by NEC/Avio Corporation was used for measuring a temperature difference/° C. between the region A and the region B when the temperature of the region A became the orientation release stress inflection point temperature T of the resin sheet S used, and measuring the temperatures of the region A and the region B when the surface temperature of the resin sheet S used was increased to the heater set temperature (generally, the temperature for determining that heat molding was enabled).

In addition, the thicknesses of the region A and the region B were measured with K351C manufactured by Anritsu Corporation, and a difference in height was measured with Surfcom ver 1.71 surface roughness meter manufactured by Tokyo Seimitsu Co., Ltd. to determine the maximum difference in thickness between the region A and the region B.

Hereinafter, in a reference example, combination of one of the sheets S1 to S3 and one of the inks P1 and P2 was appropriately changed according to Table 1. The results are shown in Tables 1 to 3.

TABLE 1

| | | Reference Example 1 | Reference Example 1 | Reference Example 1 | Reference Example 1 |
|---|---|---|---|---|---|
| Type of resin sheet S | | Sheet S0 | Sheet S0 | Sheet S1 | Sheet S0 |
| Orientation release stress inflection point temperature T of the resin sheet S | | 188° C. | 188° C. | 188° C. | 188° C. |
| Ink | | Ink P1 | Ink P1 | Ink P2 | Ink P1 |
| Expansion magnification % | | 100 | 100 | 100 | 100 |
| Heater set temperature/° C. | | 180 | 190 | 180 | 195 |
| Temperature difference/° C. between region A and region B when temperature of region A was the orientation release stress inflection point temperature T of the resin sheet S used | | 13 (temperature difference when the temperature of region A was 188° C.) | 13 (temperature difference when the temperature of region A was 188° C.) | 30 (temperature difference when the temperature of region A was 188° C.) | 13 (temperature difference when the temperature of region A was 188° C.) |
| Surface temperature of resin sheet S/ ° C. | Region A | 196 | 206 | 227 | 213.4 |
| | Region B | 183 | 198 | 180 | 211.5 |
| | Temperature difference | 13 | 8 | 47 | 1.9 |
| Thickness of resin sheet S/ μm | Region A | 152 | 84 | 67 | 70 |
| | Region B | 195 | 209 | 130 | 231 |
| | Thickness difference | 43 | 125 | 63 | 161 |
| E' MPa | Region A | 28 | 20 | 4.9 | 17 |
| | Region B | 39 | 25 | 42 | 18 |

TABLE 2

| | | Reference Example 5 | Reference Example 6 |
|---|---|---|---|
| Type of resin sheet S | | Sheet S2 | Sheet S3 |
| Orientation release stress inflection point temperature T of the resin sheet S | | 170° C. | 109° C. |
| Ink | | Ink P1 | Ink P2 |
| Expansion magnification % | | 100 | 100 |
| Heater set temperature/° C. | | 170 | 90 |
| Temperature difference/° C. between region A and region B when temperature of region A was the orientation release stress inflection point temperature T of the resin sheet S used | | 15 (temperature difference when the temperature of region A was 170° C.) | 18 (temperature difference when the temperature of region A was 109° C.) |
| Surface temperature of resin sheet S/° C. | Region A | 184 | 133 |
| | Region B | 174 | 112 |
| | Temperature difference | 7 | 21 |

TABLE 2-continued

|  |  | Reference Example 5 | Reference Example 6 |
|---|---|---|---|
| Thickness of resin sheet S/ μm | Region A | 40 | 241 |
|  | Region B | 25 | 149 |
|  | Thickness difference | 15 | 92 |
| E' MPa | Region A | 6.3 | 1.1 |
|  | Region B | 10 | 28 |

TABLE 3

|  |  | Reference Comparative Example 1 | Reference Comparative Example 2 | Reference Comparative Example 3 |
|---|---|---|---|---|
| Type of resin sheet S |  | Sheet S0 | Sheet S0 | Sheet S5 |
| Orientation release stress inflection point temperature T of the resin sheet S |  | 188° C. | 188° C. | No |
| Ink |  | Ink P1 | Ink P3 | Ink P2 |
| Expansion magnification % |  | 100 | 100 | 100 |
| Heater set temperature/° C. |  | 175 | 190 | 100 |
| Temperature difference/° C. between region A and region B when temperature of region A was the orientation release stress inflection point temperature T of the resin sheet S used |  | 13 (temperature difference when the temperature of region A was 188° C.) | 5 (temperature difference when the temperature of region A was 188° C.) | — |
| Surface temperature of resin sheet S/ ° C. | Region A | 185 | 203 | 121 |
|  | Region B | 175 | 198 | 100 |
|  | Temperature difference | 10 | 5 | 21 |
| Thickness of resin sheet S/ μm | Region A | 201 | 212 | 243 |
|  | Region B | 196 | 215 | 239 |
|  | Thickness difference | 5 | 3 | 4 |
| E' MPa | Region A | 48 | 22 | 6.5 |
|  | Region B | 48 | 25 | 8.0 |

As a result, in Reference Examples 1 to 6, projections and depressions can be satisfactorily expressed.

Reference Comparative Example 1 is an example in which the temperature of the region A is lower than the inflection point temperature of orientation returning strength of the sheet, and thus projections and depressions cannot be expressed.

Reference Comparative Example 2 uses the color ink and cannot express projections and depressions in spite of the temperature of the region A equal to or higher than the inflection point temperature of orientation returning strength.

Reference Comparative Example 3 uses the sheet S5 not exhibiting heat shrinkability (having no inflection point temperature of orientation retuning strength). Although the heater set temperature exceeds the heat softening point of the sheet S5, at which molding can be performed without a problem, projections and depressions cannot be expressed.

(Injection Molding Resin)

Injection molding resin P1: Kralastic GA-501 manufactured by Nippon A & L Inc., injection molding resin temperature 240° C.

Injection molding resin P2: Multilon T-3714 manufactured by Teijin Kasei Co., Ltd., injection molding resin temperature 270° C.

Injection molding resin P3: Dicstyrene XC520 manufactured by DIC Corporation, injection molding resin temperature 220° C.

(Method for Producing Injection-Molded Product by Irradiating the Resin Sheet with Infrared Rays to Create a Thickness Difference Between the Region A and Region B Before Placing the Resin Sheet in the Injection Mold and then Placing the Resin Sheet in the Injection Mold and Injection-Molding it)

Production Example 1

The sheet S1 was used as the resin sheet S and a predetermined pattern was printed thereon by gravure printing with the ink G1 (refer to FIG. 8). The sheet was clamped at the periphery thereof, and then upper and lower boxes of "NGF-0709 molding machine" manufactured by Fu-se Vacuum Forming were closed to create a substantially completely vacuum condition in the boxes. Then, the resin sheet S was indirectly heated from the upper surface using a mid-infrared heater manufactured by Helius Corporation as a heater. After the surface temperature of the resin sheet S was increased to the set temperature at the start of molding, the resin sheet S was cooled to normal temperature, and then the clamp was removed to prepare a sheet (F1) having a printed surface and a non-printed surface both in a concave-convex state (refer to FIG. 9).

Production Example 2

The sheet S1 was used as the resin sheet S and a predetermined pattern was printed thereon by gravure printing with the ink G2 (refer to FIG. 8). The sheet was clamped at the periphery thereof, and then upper and lower boxes of "NGF-0709 molding machine" manufactured by Fu-se Vacuum Forming were closed to create a substantially completely vacuum condition in the boxes. Then, the resin sheet S was indirectly heated from the upper surface using a mid-infrared heater manufactured by Helius Corporation as a heater. Then, a table on which a smooth stainless plate was placed was raised, and compressed-air of 0.2 MPa was blown into the upper box to press the non-printed surface of the resin sheet S on the stainless plate to preform the resin sheet S, thereby forming a sheet (F2) having projections and depressions only on the printed surface (refer to FIG. 10).

Production Example 3

The sheet S3 was used as the resin sheet S and a predetermined pattern was printed thereon by gravure printing with the ink G1 (refer to FIG. 8).

A sheet (F3) having projections and depressions only on the printed surface was formed by the same method as in Reference Example 2 (refer to FIG. 10).

Production Example 4

The sheet S2 was used as the resin sheet S and a predetermined pattern was printed thereon by gravure printing with the ink G1 (refer to FIG. 8).

A sheet (F4) having projections and depressions only on the printed surface was formed by the same method as in Reference Example 2 (refer to FIG. 10).

Examples 1 to 4

Method for Producing Injection-Molded Product

Each of the sheets (F1) to (F4) formed in Production Examples 1 to 4, respectively, was closely adhered to an injection mold so that the surface opposite to the ink layer was brought into contact with a female mold of the injection mold and heated at a mold temperature of 50° C. Then, any one of the injection molding resins P1 to P3 was heated to a predetermined injection molding resin temperature, injected into the mold, and integrally molded, thereby forming an integral-type injection molded product of each of the sheets (F1) to (F4). As the injection molding machine, EC75N-1.5Y manufactured by Toshiba Machine Co., Ltd. was used. As the injection mold, tray-shaped mold A of 99.5 (L)×99.5 (W)×12.5 (H) mm with corner R=10 mm, rising portion R=5R, and a draft angle of 18.5° was used.

(Evaluation of Depth Feel of Injection-Molded Product)

A depth feel of each of the injection-molded products produced in Examples 1 to 4 was evaluated as follows. That is, each injection-molded product was visually observed from the integrated sheet side to evaluate a depth feel on the basis of criteria below. The results obtained by evaluation by three persons among five persons were employed.

A: A depth feel can be very vividly and clearly recognized.
B: A depth feel can be recognized at a glance.
C: A depth feel can be recognized by observing at various angles.
D: No depth feel can be recognized.

The results are shown in Table 4.

Examples 5 to 8

Method for Producing Injection-Molded Product Having Projections and Depressions The sheets (F1) to (F4) were separated from the injection-molded products produced in Examples 1 to 4, respectively. The transfer-type injection-molded products of the sheets (F1) to (F4) were evaluated with respect to convex-concave difference reproducibility and scratch resistance as follows.

(Evaluation of Concave-Convex Difference Reproducibility of Injection-Molded Product)

A: Concave-convex transfer rate of 90% or more, represented by concave-convex difference of decorative injection-molded product/maximum concave-convex difference of film before injection molding×100

B: Concave-convex transfer rate of less than 90%, represented by concave-convex difference of decorative injection-molded product/maximum concave-convex difference of film before injection molding×100

C: Concave-convex transfer rate of less than 30%, represented by concave-convex difference of decorative injection-molded product/maximum concave-convex difference of film before injection molding×100

In addition, the maximum concave-convex difference of the film before injection molding was determined as a value of thickness difference in the state having the maximum thickness difference among the state of the resin sheet S and the state of the sheets (F1) to (F4).

(Evaluation of Scratch Resistance Test)

Absorbent cotton sufficiently impregnated with a 5% cleanser solution was placed on a surface of the injection-molded product, and a tester terminal was pressed on the absorbent cotton using a rubbing tester (manufactured by Taihei Rika Kogyo K. K.). Then, the cotton was moved in 30 cycles under a load of 1 Kg applied, washed with water, and then immediately dried with a towel to visually evaluate the print surface. Evaluation was made based on a difference from a comparative plate of the same resin formed without a shaping sheet. The criteria used were as follows.

A: Completely no difference from the comparative sheet was observed.
B: No difference from the comparative sheet was observed.
C: Low glass was slightly observed as compared with the comparative plate.
D: Low gloss was significantly observed.

The results are shown in Table 5.

TABLE 4

|  |  | Example 1 | Example 2 | Example 3 | Example 4 |
|---|---|---|---|---|---|
| Type of resin sheet S | | Sheet S1 | Sheet S1 | Sheet S3 | Sheet S2 |
| Printing plate configuration | | One plate | One plate | One plate | One plate |
| Ink | | G1 | G2 | G1 | G1 |
| Expansion magnification % | | 100 | 100 | 100 | 100 |
| Molding start set temperature/° C. | | 185 | 185 | 100 | 170 |
| Temperature difference/° C. between region A and region B when temperature of region A was the orientation release stress inflection point temperature T of the resin sheet S used | | 12 (temperature difference when the temperature of region A was 188° C.) | 10 (temperature difference when the temperature of region A was 188° C.) | 9 (temperature difference when the temperature of region A was 109° C.) | 15 (temperature difference when the temperature of region A was 170° C.) |
| Type of injection molding resin P | | P1 | P3 | P2 | P1 |
| Surface temperature of resin sheet S/° C. | Region A | 213 | 206 | 123 | 184 |
| | Region B | 200 | 197 | 111 | 174 |
| | Temperature difference | 13 | 9 | 12 | 7 |
| Thickness of sheet (F)/μm | Type of sheet | (F1) | (F2) | (F3) | (F4) |
| | Region A | 81 | 75 | 210 | 40 |
| | Region B | 135 | 128 | 302 | 25 |
| | Thickness difference | 54 | 53 | 92 | 15 |
| Evaluation of depth feel of integral injection-molded product of sheet (F) | | A | A | A | B~C |

TABLE 5

|  |  | Example 5 | Example 6 | Example 7 | Example 8 |
|---|---|---|---|---|---|
| Type of sheet |  | (F1) | (F2) | (F3) | (F4) |
| Concave-convex difference of transfer-type injection molded product of sheet (F) | Depth difference | 53 | 53 | 90 | 13 |
|  | Reproducibility | A | A | A | A |
| Evaluation of scratch resistance test |  | A | A | A | B |

Example 9

Method for Producing Injection-Molded Product Having Projections and Depressions by Combination with an Insert Film The sheet (F2) produced in Production Example 2 and an insert film "T9116-05 (decorative film including a laminate of a hairline printed layer and a UV curing layer) manufactured by Nihon Decoall Corporation were closely adhered to an injection mold so that the surface opposite to an ink layer of the sheet (F2) was in contact with a female mold of the injection mold. The sheets were placed in the mold in a laminated state in which the ink layer of the sheet (F2) faced the surface of the insert film on the side opposite to the ink layer.

After heating at a mold temperature of 50° C., the injection molding resin P2 was heated to a predetermined injection molding resin temperature and injected into the mold to be integrally molded. After the injection-molded product was taken out from the mold, the sheet (F2) and the release film of the insert film were separated from the product to form an injection-molded product having the hairline printed layer and UV curing layer transferred thereto from the insert film. Then, the UV curing layer was cured by irradiating UV light with an irradiation amount of 1000 mJ/cm² and a peak strength of 200 mW/cm² using an UV irradiation device manufactured by GS Yuasa Co., Ltd. provided with a high-pressure mercury lamp (main wavelengths: 254 nm, 313 nm, 365 nm, 405 nm, 436 nm, 546 nm, and 577 nm) manufactured by GS Yuasa Co., Ltd. The results are shown in Table 6.

Example 10

Method for Producing an Injection-Molded Product Having a Surface Protecting Layer and Projections and Depressions The sheet S2 was used as the resin sheet S. A predetermined pattern was printed by gravure printing with the inks G1, GH1, GH2, and GH4 on the surface protecting layer (hereinafter referred to as "TP") of the sheet S2 coated with the surface protecting layer (refer to FIG. 11).

A sheet (F6) having projections and depressions on only a non-printed surface was formed through preforming by the same method as in Example 2 except that the print surface of the sheet S2 was pressed on a stainless plate (refer to FIG. 12). A transfer-type injection-molded product of the sheet (F6) was produced by the same method as in Example 1 (refer to FIGS. 13 to 15), and then the sheet (F6) was removed from the molded product (refer to FIG. 16).

The resultant injection-molded product having projections and depressions had the ink G1 and inks GH1 to GH4 transferred thereto. The results are shown in Table 6.

(Surface Protecting Layer)

The surface protecting layer was provided by applying a mixture containing a hydroxyl group-containing copolymer and a polyisocyanate compound at a ratio of 1:1 to a thickness of 10 μm.

(Hydroxyl Group-Containing Copolymer)

A mixed solution containing 850 parts of butyl acetate and 1 part of Perbutyl Z (trade name, manufactured by NOF Corporation, tert-butyl peroxybenzoate) was heated to 110° C., and to this mixed solution, a mixed solution containing 660 parts of methyl methacrylate, 150 parts of tert-butyl methacrylate, and 190 parts of 2-hydroxyethyl methacrylate and a mixed solution containing 200 parts of isobutyl acetate, 9 parts of Perbutyl O (trade name, manufactured by NOF Corporation, tert-butyl peroxy-2-ethylhexanoate), and 2 parts of Perbutyl Z (trade name, manufactured by NOF Corporation, tert-butyl peroxybenzoate) were added dropwise and mixed over about 5 hours in a nitrogen atmosphere. The resultant mixture was stirred for 15 hours to produce a hydroxyl group-containing copolymer having a solid content of 60%. The resultant resin had a weight-average molecular weight of 100,000, a solid content hydroxyl value of 79 KOHmg/g, and a glass transition temperature Tg of 95° C. In this case, the weight-average molecular weight was a value in terms of polystyrene measured by GPC, the hydroxyl value was a value calculated as an amount KOH required for neutralization from the monomer composition charged, and the polymer Tg was a value measured by DSC.

(Polyisocyanate Compound)

As the polyisocyanate compound, isocyanurate ring-containing polyisocyanate "BURNOCK DN-981" (trade name, manufactured by DIC Corporation, number-average molecular weight, about 1000; nonvolatile content 75% (solvent: ethyl acetate); functional group number 3; NCO concentration 13 to 14%) was used.

TABLE 6

|  |  | Example 9 | Example 10 |
|---|---|---|---|
| Type of resin sheet S |  | Sheet S1 | Sheet S2 |
| Printing plate configuration |  | One plate | Four plates |
| Ink |  | G2 | G1, GH1, GH2, GH4 |
| Expansion magnification % |  | 100 | 100 |
| Molding start set temperature/° C. |  | 185 | 175 |
| Temperature difference/° C. between region A and region B when temperature of region A was the orientation release stress inflection point temperature T of the resin sheet S used |  | 10 (temperature difference when the temperature of region A was 188° C.) | 18 (temperature difference when the temperature of region A was 170° C.) |
| Type of injection molding resin P |  | P2 | P2 |
| Surface temperature of resin sheet S/° C. | Region A | 206 | 189 |
|  | Region B | 197 | 178 |
|  | Temperature difference | 9 | 11 |
| Thickness of shaping sheet/μm | Region A | 75 | 37 |
|  | Region B | 128 | 61 |
|  | Thickness difference | 53 | 24 |

TABLE 6-continued

|  |  | Example 9 | Example 10 |
|---|---|---|---|
| Concave-convex difference of transfer-type injection-molded product of sheet (F) | Depth difference | 51 | 22 |
|  | Reproducibility | A | A |
| Evaluation of scratch resistance test |  | A | A |

Example 11

Method for Producing an Injection-Molded Product Having Projections and Depressions Using Sheet (F7) Preformed in Injection Mold The sheet S1 was used as the resin sheet S, and a predetermined pattern was printed thereon by gravure printing with the ink G1 (refer to FIG. 8).

The sheet was clamped at the periphery thereof, and then upper and lower boxes of "NGF-0709 molding machine" manufactured by Fu-se Vacuum Forming were closed to create a substantially completely vacuum condition in the boxes. Then, the resin sheet S was indirectly heated from the upper surface using a mid-infrared heater manufactured by Helius Corporation as a heater. After the surface temperature of the resin sheet S was increased to the set temperature at the start of molding, a table on which a tray-shaped mold A of 99.5 (L)×99.5 (W)×12.5 (H) mm with corner R=10 mm, rising portion R=5R, and a draft angle of 18.5° was placed was raised, and compressed-air of 0.2 MPa was blown into the upper box to preform the sheet with the mold A, thereby forming a sheet (F7) having projections and depressions only on the printed surface.

The sheet (F7) was closely adhered to be in contact with a female mold of an injection mold having the same shape as the mold A and heated at a mold temperature 50° C., and then the injection molding resin P3 was heated to a predetermined injection molding resin temperature, injected into the mold, and integrally molded. Then, the product was taken out from the mold, and then the sheet (F7) was separated from the product to form a transfer-type injection-molded product of the sheet (F7). The results are shown in Table 7.

TABLE 7

|  |  | Example 11 |
|---|---|---|
| Type of resin sheet S |  | Sheet S1 |
| Printing plate configuration |  | One plate |
| Ink |  | G1 |
| Expansion magnification % |  | 120 |
| Molding start set temperature/° C. |  | 185 |
| Temperature difference/° C. between region A and region B when temperature of region A was the orientation release stress inflection point temperature T of the resin sheet S used |  | 10 (temperature difference when the temperature of region A was 188° C.) |
| Type of injection molding resin P |  | P3 |
| Surface temperature of resin sheet S/° C. | Region A | 206 |
|  | Region B | 197 |
|  | Temperature difference | 9 |
| Thickness of shaping sheet/μm | Region A | 59 |
|  | Region B | 103 |
|  | Thickness difference | 44 |
| Concave-convex difference of transfer-type injection-molded product of sheet (F) | Depth difference | 39 |
|  | Reproducibility | A |
| Evaluation of scratch resistance test |  | A |

Comparative Example 1

Example not Using Infrared Rays as Heating Source

A sheet (HF1) was formed by the same method as in Example 1 except that the sheet was placed for 5 minutes in Gear Oven GPHH-100 (using hot air as a heating source) manufactured by Tabai Espec Corporation, which was heated to a predetermined temperature and maintained at the temperature, instead of the mid-infrared heater manufactured by Helius Corporation. No difference in thickness occurred in the sheet (HF1).

Then, an integral injection-molded product (HF1) of the sheet (HF1) was formed by the same method as in Example 1. The results are shown in Table 5. As a result, a visible concave-convex feel could not be obtained. In addition, the sheet (HF1) was separated from the product by the same method as in Example 5, forming a transfer-type injection-molded product (HF1) of the sheet (HF1). Consequently, projections and depressions could not be produced.

TABLE 8

|  |  | Comparative Example 1 |
|---|---|---|
| Type of resin sheet S |  | Sheet S1 |
| Printing plate configuration |  | One plate |
| Ink |  | G1 |
| Expansion magnification % |  | 100 |
| Heating temperature/° C. |  | 185 (hot air) |
| Temperature difference/° C. between region A and region B when temperature of region A was the orientation release stress inflection point temperature T of the resin sheet S used |  | 10 (temperature difference when the temperature of region A was 188° C.) |
| Type of injection molding resin P |  | P3 |
| Surface temperature of resin sheet S/° C. | Region A | 198 |
|  | Region B | 198 |
|  | Temperature difference | 0 |
| Thickness of shaping sheet/μm | Region A | 131 |
|  | Region B | 133 |
|  | Thickness difference | 2 |
| Concave-convex difference of injection-molded product | Depth difference | 0 |
|  | Reproducibility | A |
| Evaluation of scratch resistance test |  | A |

Comparative Example 2

Example Using Embossed Decorative Sheet

A decorative molded product was formed by the same method as in Example 10 except that embossed decorative sheet "Sunny Cloth-05E (thickness 140 μm)" manufacture by Nihon Decoall Corporation was used as the sheet. Since "Sunny Cross-05E" was previously imparted with projections and depressions by a heat roll, a depth of projections and depressions of the sheet 6 before preforming, a depth of projections and depressions of the sheet 6 after preforming, and a concave-convex difference of the injection-molded product were indicated. In addition, reproducibility was evaluated on the basis of a convex-concave difference of "Sunny Cross-05E" having the maximum concave-convex difference. As a result, projections and depressions were reduced during preforming, and thus reproducibility of concave-convex difference of the injection-molded product was evaluated as "C". The results are shown in Table 9.

TABLE 9

|  |  | Comparative Example 2 |
|---|---|---|
| Type of resin sheet S |  | Sunny Cross-05E |
| Expansion magnification % |  | 120 |
| Molding start set temperature/° C. |  | 113 |
| Type of injection molding resin P |  | P3 |
| Surface temperature of resin sheet S/° C. | Region A | 123 |
|  | Region B | — |
|  | Temperature difference | — |
| Thickness of resin sheet S/µm | Minimum | 65 |
|  | Maximum | 145 |
|  | Thickness difference | 80 |
| Thickness of shaping sheet/µm | Minimum | 87 |
|  | Maximum | 120 |
|  | Thickness difference | 33 |
| Concave-convex difference of injection-molded product | Depth difference | 13 |
|  | Reproducibility | C |
| Evaluation of scratch resistance test |  | A |

(Method for Producing an Injection-Molded Product by Placing a Resin Sheet in the Injection Mold, then Irradiating the Resin Sheet with Infrared Rays to Form a Thickness Difference Between the Region A and Region B, Closing the Mold, and then Performing Injection-Molding)

Production Example 5

Method for Producing Pattern-Printed Sheet (1)

A pattern having a thickness of 3 µm was printed on the resin sheet S1 by a four-color gravure printing machine using the inks G6 and GH6 to produce a pattern-printed sheet (M1) (refer to a pattern shown in FIG. 17).

Production Examples 6 to 8

Method for Producing Pattern-Printed Sheets (M2) to (M4)

Pattern-printed sheets (M2) to (M4) were produced by the same method as in Production Example 5 except that the types of the resin sheet and ink used, the number of plates, and the heating temperature were changed according to Table (for Production Examples 5 and 7, refer to a pattern shown in FIG. 17; for Production Example 8, refer to a pattern shown in FIG. 18; and for Production Example 9, refer to a pattern shown in FIG. 19).

Example 12

Method for Producing Injection-Molded Product

The pattern-printed sheet (M1) in the state of being completely clamped at the periphery was indirectly heated using a medium-wavelength infrared heater manufactured by Helius Corporation as a heater. After the heat was retracted, a mold was completely closed, the sheet was closely adhered to the mold by suction so that the surface opposite to the ink layer was in contact with the female mold of the injection mold, and any one of the injection molding resins P1 to P3 was heated to a predetermined injection molding resin temperature, injected into the mold, and then integrally molded, thereby forming an integral injection-molded product (M1) of the sheet (M1). As the injection molding machine, EC75N-1.5Y manufactured by Toshiba Machine Co., Ltd. was used. As the injection mold, tray-shaped mold A of 99.5 (L)×99.5 (W)×12.5 (H) mm with corner R=10 mm, rising portion R=5R, and a draft angle of 18.5° was used. The resin pressure was about 180 MPa/cm$^2$, and the mold temperature was 50° C. The same evaluation as in Example 1 was made. The evaluation results are shown in Table 10. (For the production method in Example 12, refer to FIGS. 20, 21, and 22.)

Examples 13 to 15

Method for Producing Injection-Molded Product

Integral injection-molded products (M2) to (M4) of the pattern-printed sheets (M2) to (M4), respectively, were produced by the same method as in Example 12 except that the pattern-printed sheets (M2) to (M4) were used in place of the pattern-printed sheet (M1). The same evaluation as in Example 1 was made. The evaluation results are shown in Table 10.

Examples 16 to 19

Method for Producing Injection-Molded Product Having Projections and Depressions The pattern-printed sheets (M1) to (M4) were separated from the injection-molded products (M1) to (M4) produced in Examples 12 to 15, respectively, to produce transfer-type injection-molded products of the sheets (M1) to (M4). The maximum concave-convex difference of each of the injection-molded products was measured. With respect to the surface temperatures of a region A printed with the ink and a region B not printed with the ink, Thermotracer TH9100 manufactured by NEC/Avio Corporation were used for measuring a temperature difference/° C. between the region A and the region B when the temperature of the region A became the orientation release stress inflection point temperature T of the resin sheet S used, and measuring the temperatures of the region A and the region B when the surface temperature of the pattern-printed sheet (1) used was increased to the heater set temperature (generally, the temperature for determining that heat molding was enabled).

The thicknesses of the region A and the region B were measured with K351C manufactured by Anritsu Corporation, and a difference in height was measured with Surfcom ver 1.71 surface roughness meter manufactured by Tokyo Seimitsu Co., Ltd. to measure the maximum difference in thickness between the region A and the region B.

The results are shown in Table 1.

The concave-convex difference reproducibility and scratch resistance of each of the injection-molded products were evaluated by the same methods as in Example 1. The results are shown in Table 11.

TABLE 10

| | Example 12 | Example 13 | Example 14 | Example 15 |
|---|---|---|---|---|
| Name of pattern-printed sheet | Pattern-printed sheet (M1) | Pattern-printed sheet (M2) | Pattern-printed sheet (M3) | Pattern-printed sheet (M4) |
| Type of resin sheet S | Sheet S1 | Sheet S1 | Sheet S4 | Sheet S2 |
| Printing plate configuration | Two plates | Two plates | Two plates | Four plates |
| Ink | G16, GH6 | G5 | G4, GH6 | G4, GH5, GH6, GH7 |
| Type of injection molding resin | P1 | P3 | P2 | P2 |
| Expansion magnification % | 120 | 120 | 120 | 120 |
| Heater set temperature/° C. | 185 | 185 | 100 | 175 |
| Temperature difference/° C. between region A and region B when temperature of region A was the orientation release stress inflection point temperature T of the resin sheet S used | 8 (temperature difference when the temperature of region A was 188° C.) | 10 (temperature difference when the temperature of region A was 188° C.) | 9 (temperature difference when the temperature of region A was 109° C.) | 11 (temperature difference when the temperature of region A was 170° C.) |
| Surface temperature of resin sheet S/° C.  Region A | 205 | 207 | 123 | 189 |
| Region B | 199 | 197 | 111 | 178 |
| Temperature difference | 6 | 10 | 12 | 11 |
| Thickness of resin sheet S/μm  Region A | 75 | 61 | 175 | 30 |
| Region B | 97 | 108 | 252 | 50 |
| Thickness difference | 22 | 47 | 77 | 20 |
| Type of pattern-printed sheet | (M1) | (M2) | (M3) | (M4) |
| Evaluation of depth feel of integral injection-molded product of sheet (M) | A | A | A | B |

TABLE 11

| | | Example 16 | Example 17 | Example 18 | Example 19 |
|---|---|---|---|---|---|
| Type of pattern-printed sheet | | (M1) | (M2) | (M3) | (M4) |
| Concave-convex difference of transfer-type injection-molded product of sheet (M) | Depth difference | 21 | 45 | 74 | 19 |
| | Reproducibility | A | A | A | A |
| Appearance of injection-molded product | | Distinct projections and depressions | Distinct projections and depressions | Distinct projections and depressions | Transferred pattern and distinct projections and depressions |
| Evaluation of scratch resistance | | A | A | A | B |

In any one of the integral injection-molded products (M1) to (M4) of the sheets (M1) to (M4) produced in Examples 12 to 15, respectively, a depth feel could be vividly and clearly recognized.

In any one of the transfer-type injection-molded products (M1) to (M4) of the sheets (M1) to (M4) produced in Examples 16 to 19, respectively, the observation of the appearance after separation of the pattern-printed sheet could confirm that distinct projections and depressions are formed in a pattern portion using the ink G4, G5, or G6.

In Example 16 in which the sheet S1 was printed with the ink G6 and the ink GH6 using two plates (an example having the region A having a pattern provided with the infrared absorbing ink or infrared reflecting ink and the region B not having a pattern), only a print portion of the ink G6 containing titanium oxide, which is a heat generating substance, became a projection.

In Example 17 in which the sheet was printed with the ink G5 using two plates (an example having the region A of a high-density ink and the region B of a low-density ink, the region A corresponding to an overlap portion of the two plates, and the region B corresponding to a portion printed by one plate), a projection occurred in the region A corresponding to an overlap of the two plates.

In Example 18 in which the sheet S4 was printed with the ink G4 and the ink GH6 using two plates (an example having the region A having a pattern provided with the infrared absorbing ink or infrared reflecting ink and the region B not having a pattern provided with a color ink), only a print portion of the ink G4 containing carbon black, which is a heat generating substance, became a projection.

In Example 19 using 4 plates for the inks G4, GH5, GH6, and GH7, the injection-molded product had a projection only in a print portion of the ink G4 containing carbon black which was a heat generating substance, and also had transfer portions of the inks G4, GH5, GH6, and GH7.

Comparative Example 3

Method for Producing Decorative Molded Product

A decorative molded product was produced by the same method as in Example 12 except that embossed decorative sheet "Sunny Cloth-05E (thickness 140 µm)" manufacture by Nihon Decoall Corporation was used as the sheet. Since "Sunny Cross-05E" had projections and depressions previously imparted by a heat roll, a depth of projections and depressions of the sheet 6 before preforming, a depth of projections and depressions of the sheet 6 after preforming, and a concave-convex difference of the injection-molded product were indicated. In addition, reproducibility was evaluated on the basis of a convex-concave difference of "Sunny Cross-05E" having the maximum concave-convex difference. As a result, projections and depressions were reduced during preforming, and thus reproducibility of concave-convex difference of the injection-molded product was evaluated as "C". The results are shown in Table 12.

TABLE 12

|  |  | Comparative Example 3 |
|---|---|---|
| Type of resin sheet S |  | Sunny Cross-05E |
| Expansion magnification % |  | 120 |
| Molding start set temperature/° C. |  | 113 |
| Type of injection molding resin P |  | P3 |
| Surface temperature of resin sheet S/° C. | Region A | 123 |
|  | Region B | — |
|  | Temperature difference | — |
| Thickness of resin sheet S/µm | Minimum | 65 |
|  | Maximum | 145 |
|  | Thickness difference | 80 |
| Thickness of shaping sheet/µm | Minimum | 87 |
|  | Maximum | 120 |
|  | Thickness difference | 33 |
| Concave-convex difference of injection-molded product | Depth difference | 13 |
|  | Reproducibility | C |
| Evaluation of scratch resistance test |  | A |

Figure 1:
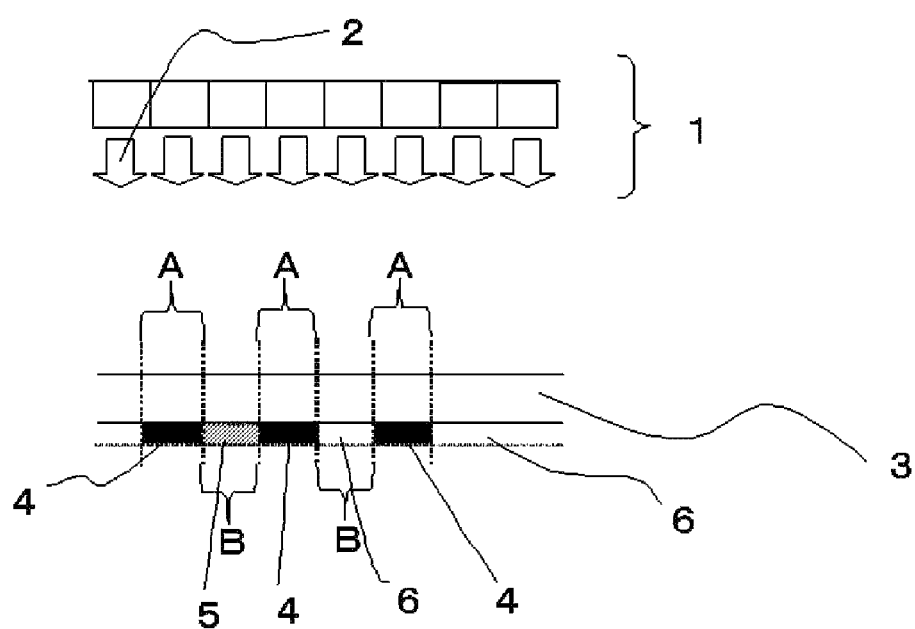
FIG. 1 is a drawing illustrating a state according to an embodiment in which a heat-shrinkable resin sheet having a pattern printed with an infrared absorbing ink is irradiated with infrared rays using an infrared heater.
Figure 2:
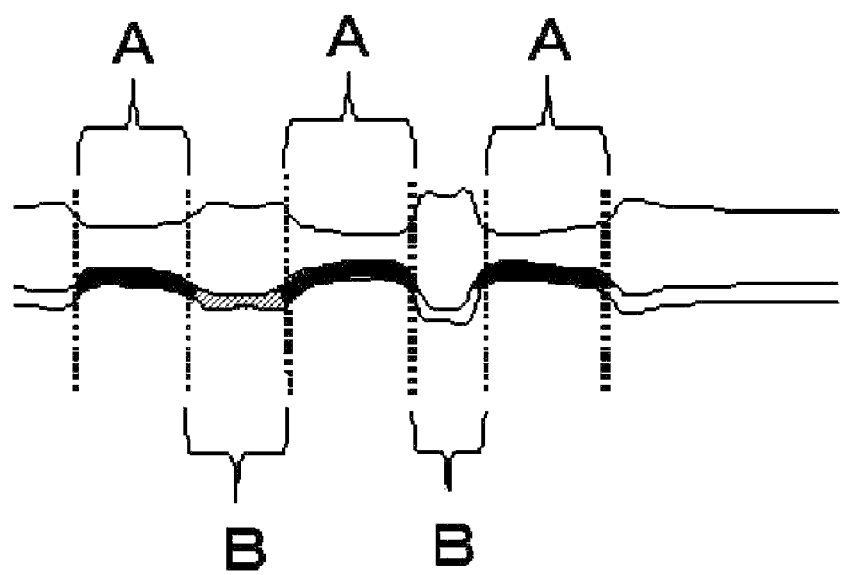
FIG. 2 is a drawing illustrating the state of the resin sheet shown in FIG. 1 after infrared irradiation of the resin sheet in a supported state.
Figure 3:
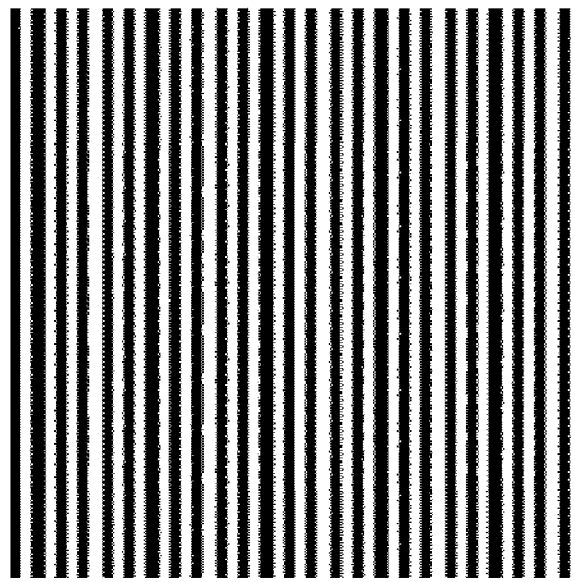
FIG. 3 is a drawing showing an example of a pattern-printed layer used in the present invention, in which the printed layer is blacked (striped).
Figure 4:
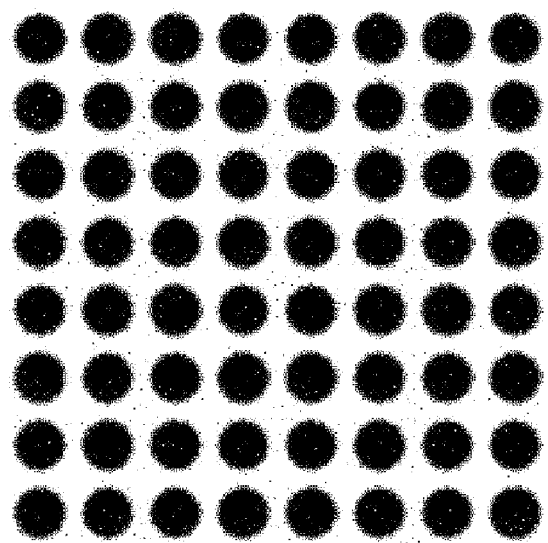
FIG. 4 is a drawing showing an example of a pattern-printed layer used in the present invention, in which the printed layer is blacked (dotted).
Figure 5:
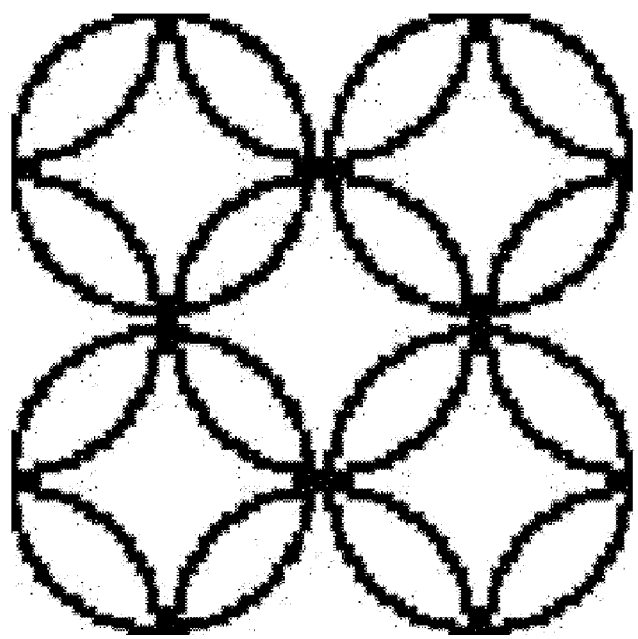
FIG. 5 is a drawing showing an example of a pattern-printed layer used in the present invention, in which the printed layer is blacked (geometrical pattern).
Figure 6:
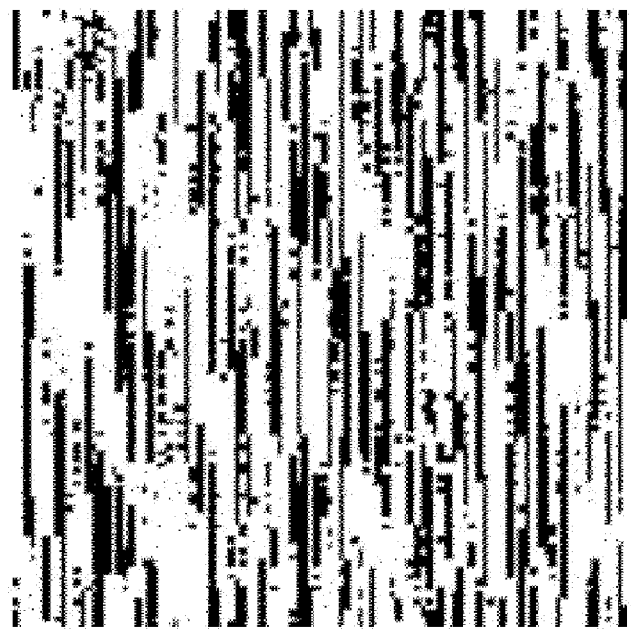
FIG. 6 is a drawing showing an example of a pattern-printed layer used in the present invention, in which the printed layer is blacked (wood grains).
Figure 7:
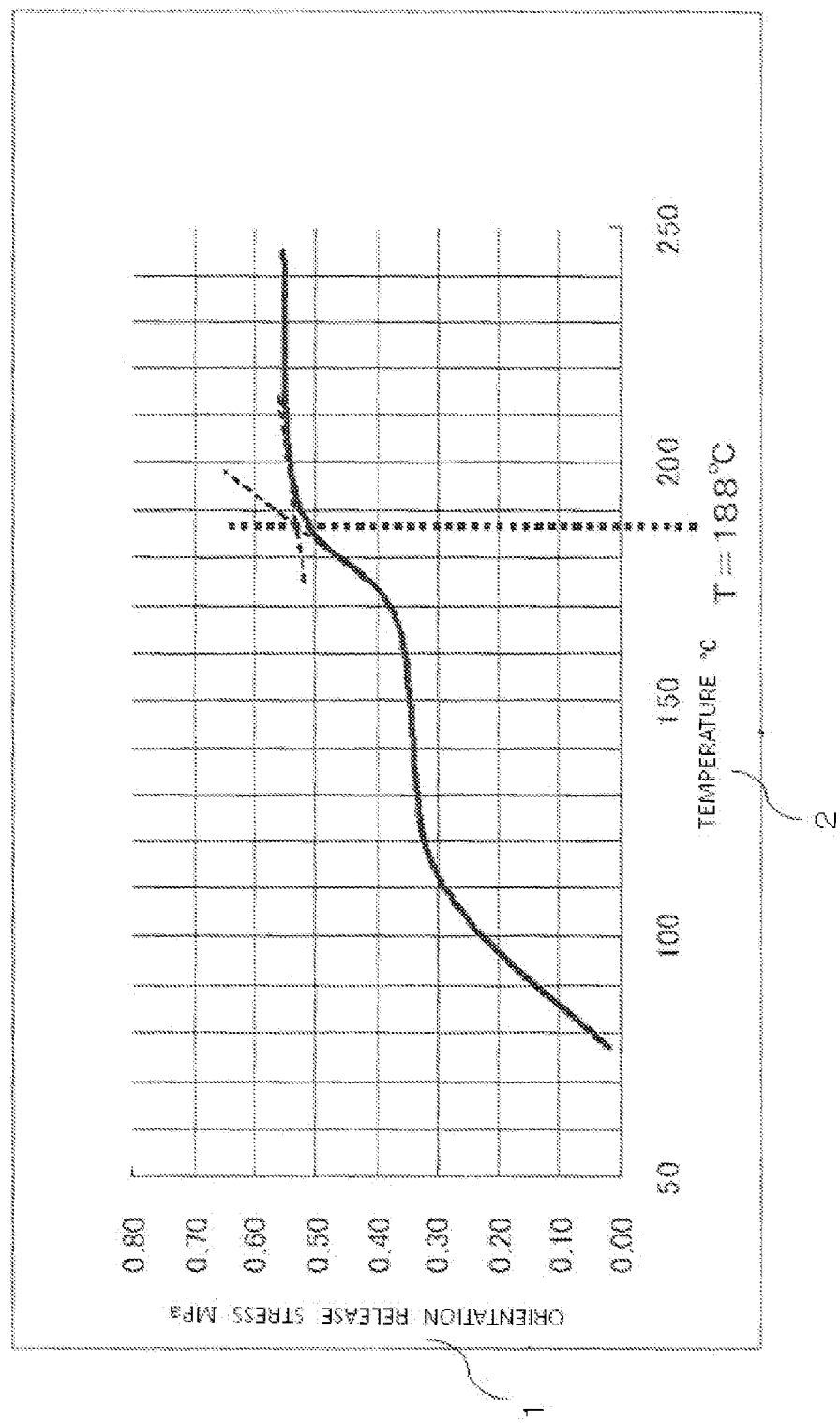
FIG. 7 is a graph showing the orientation returning strength and temperature measured for a biaxially oriented PET sheet "Softshine X1130 (thickness 125 µm)" manufactured by Toyobo Co., Ltd. (sheet S1 in an example) according to ASTM D-1504.
Figure 8:
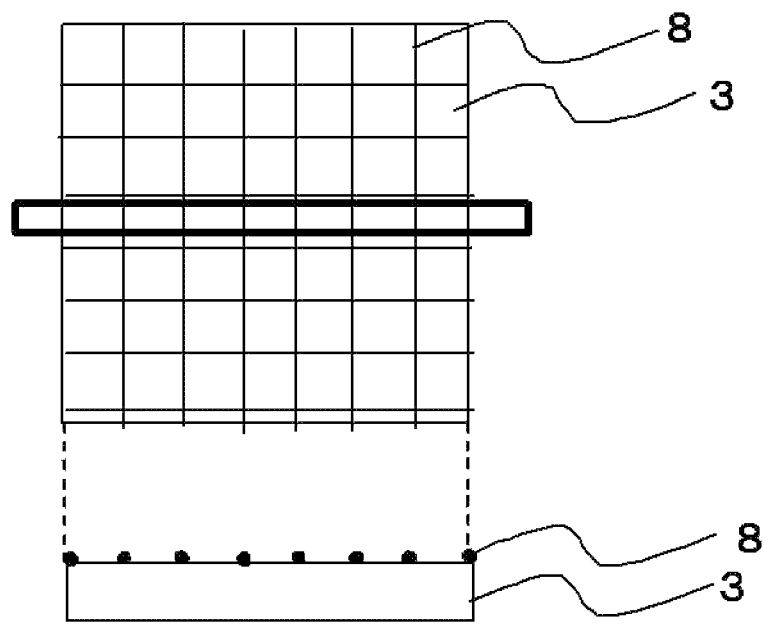
FIG. 8 is a schematic drawing of a printed resin sheet S in each of sheets (F1) to (F4) and (F7) of production examples, in which the upper portion is a plan view, and the lower portion is a sectional view of a black frame in the plan view.
Figure 9:
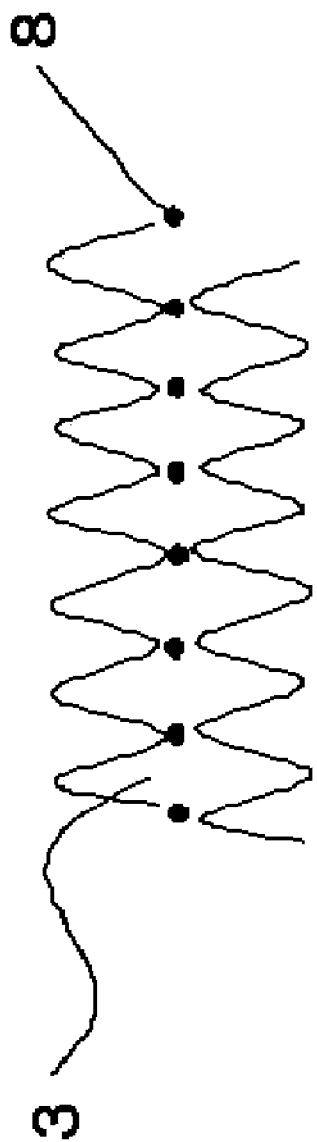
FIG. 9 is a schematic sectional view of the sheet (F1) of a production example.
Figure 10:
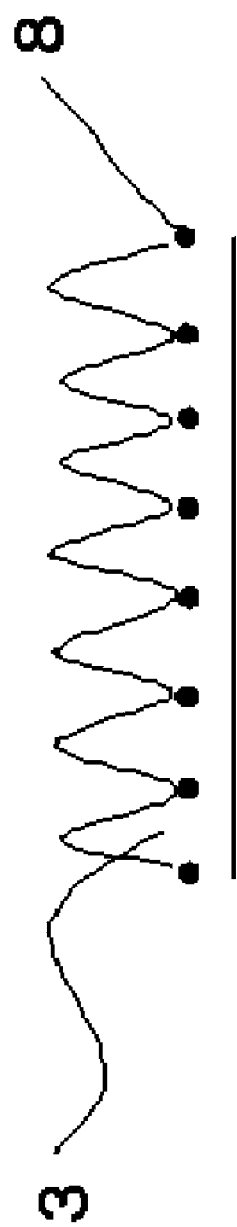
FIG. 10 is a schematic sectional view of each of the sheets (F2) to (F4) and (F7) of production examples.
Figure 11:
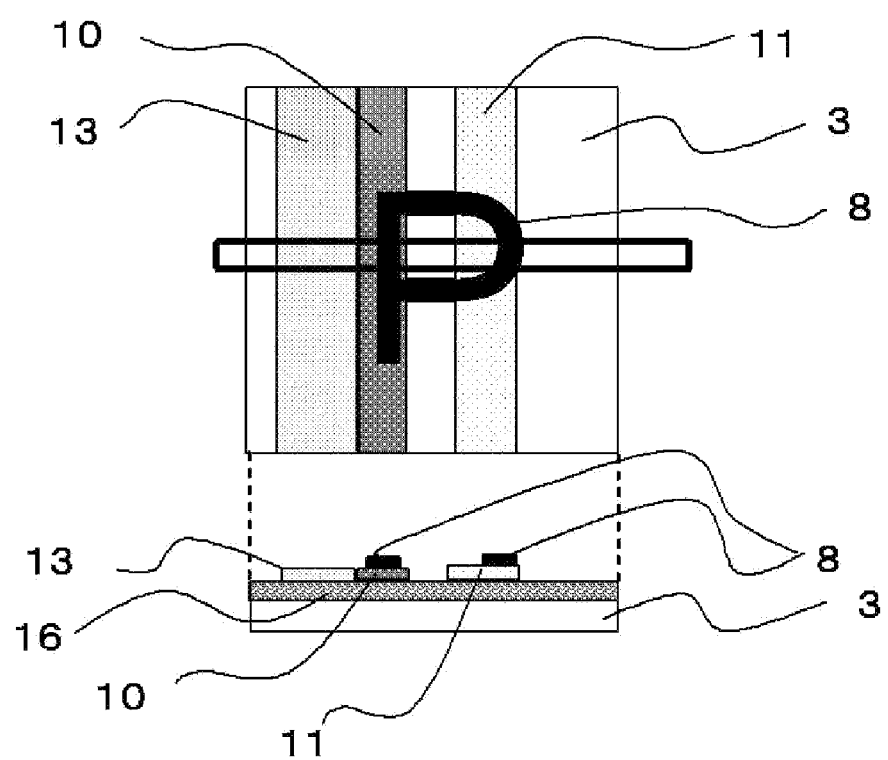
FIG. 11 is a schematic drawing of a printed resin sheet S in a sheet (F6) of a production example, in which the upper portion is a plan view, and the lower portion is a sectional view of a black frame in the plan view.
Figure 12:
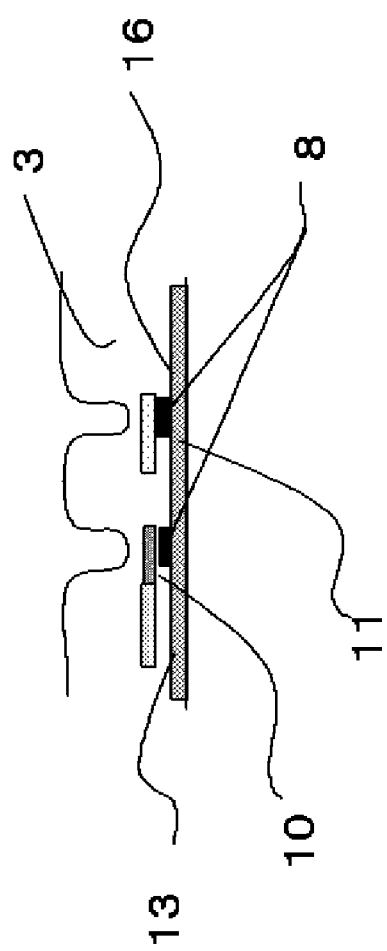
FIG. 12 is a schematic sectional view of the sheet (F6) of a production example.
Figure 13:
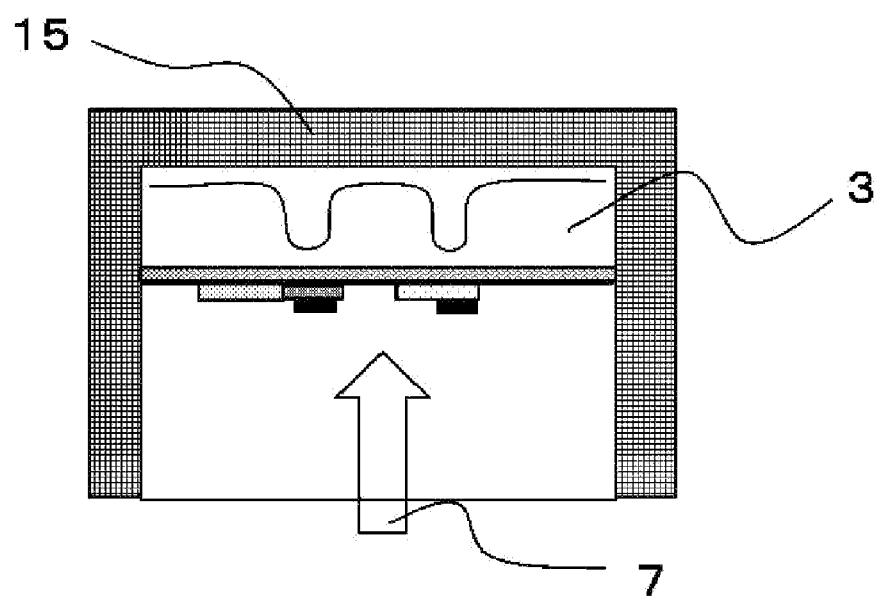
FIG. 13 is a schematic drawing showing a method for producing an injection-molded product in Example 10.
Figure 14:
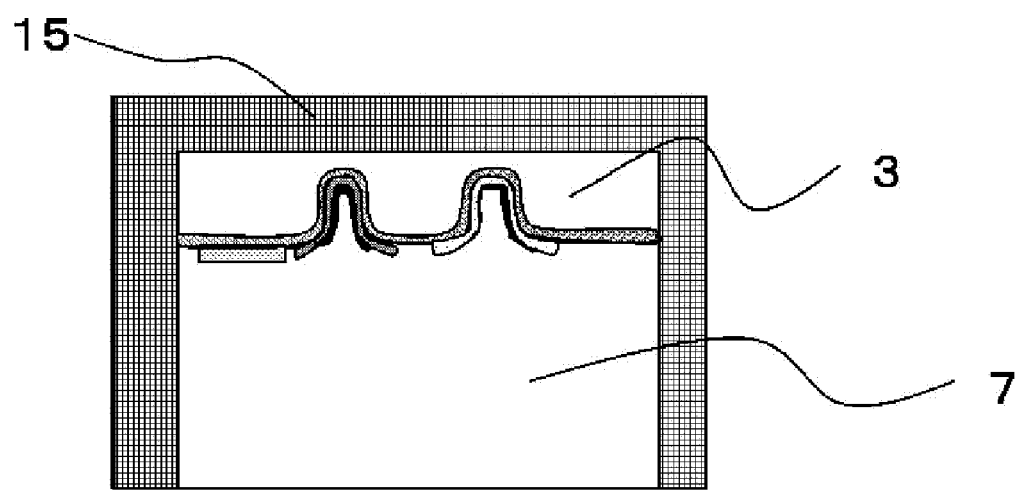
FIG. 14 is a schematic drawing showing a method for producing an injection-molded product in Example 10.
Figure 15:
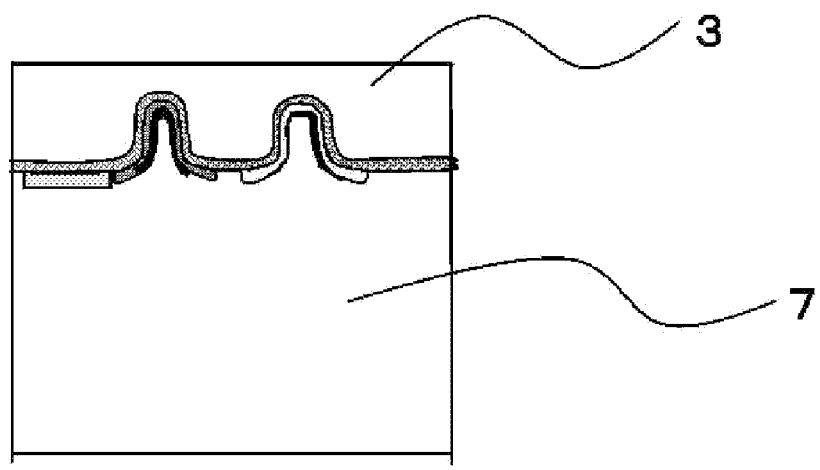
FIG. 15 is a schematic drawing showing a method for producing an injection-molded product in Example 10.
Figure 16:
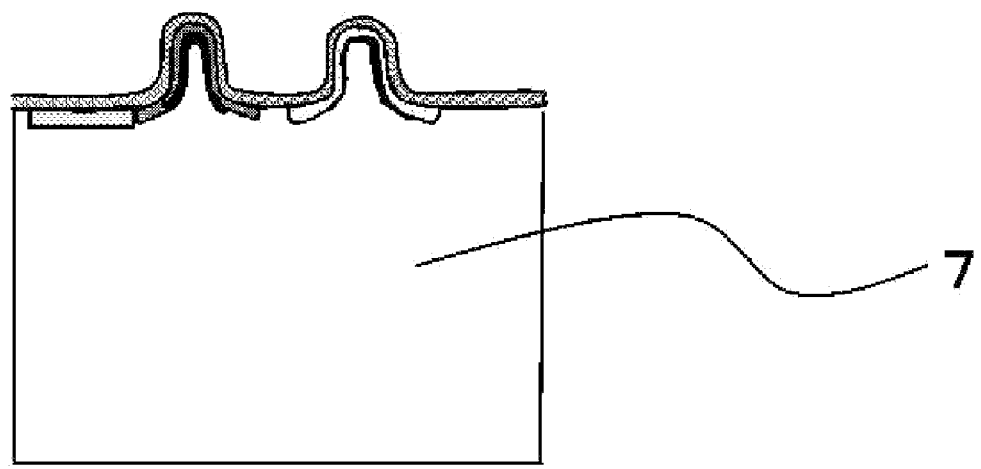
FIG. 16 is a schematic drawing showing a method for producing an injection-molded product in Example 10.
Figure 17:
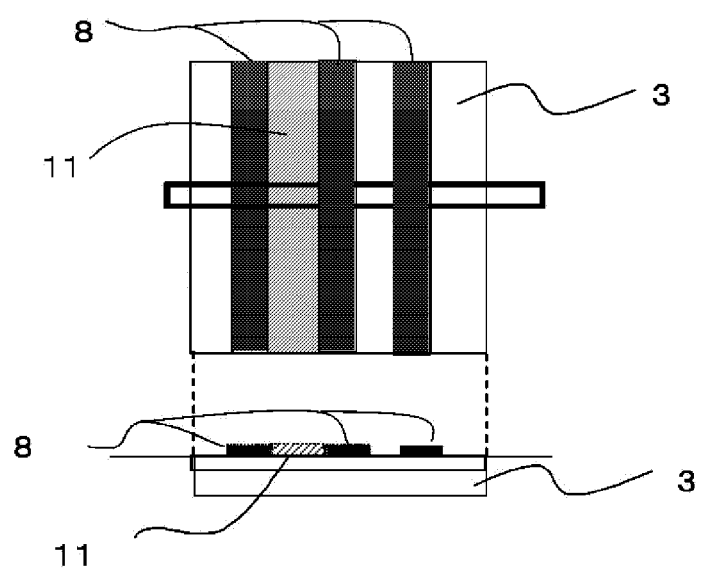
FIG. 17 is a schematic drawing of each of pattern-printed sheets (M1) and (M3) of production examples, in which the upper portion is a plan view, and the lower portion is a sectional view of a black frame in the plan view.
Figure 18:
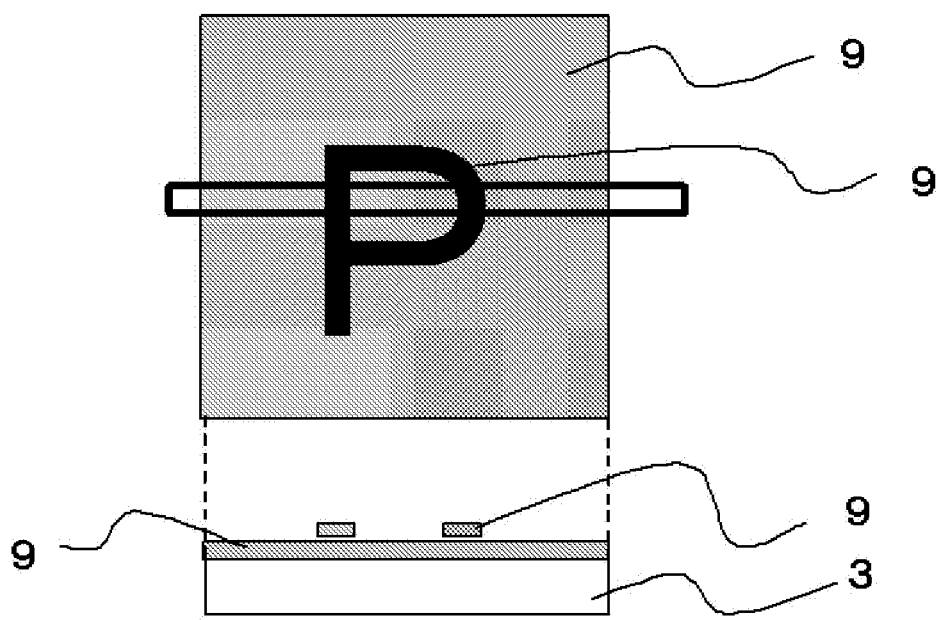
FIG. 18 is a schematic drawing of a pattern-printed sheet (M2) of a production example, in which the upper portion is a plan view, and the lower portion is a sectional view of a black frame in the plan view.
Figure 19:
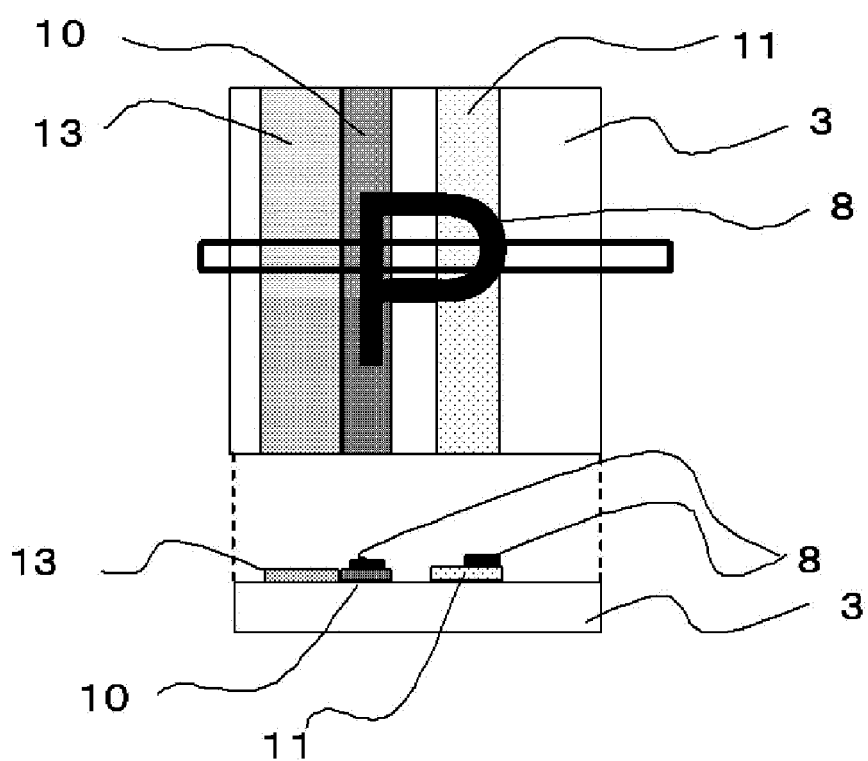
FIG. 19 is a schematic drawing of a pattern-printed sheet (M4) of a production example, in which the upper portion is a plan view, and the lower portion is a sectional view of a black frame in the plan view.
Figure 20:
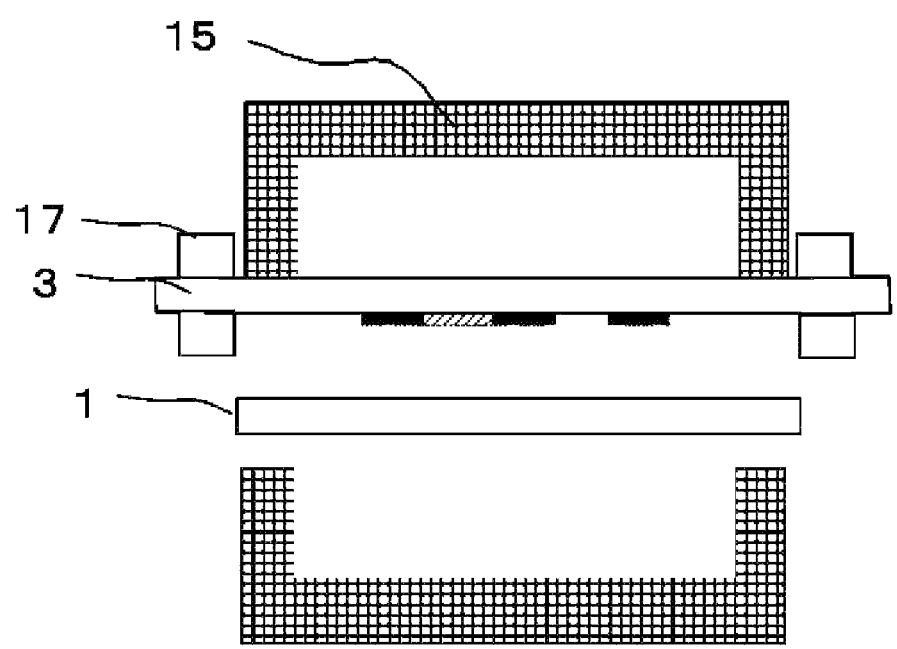
FIG. 20 is a schematic drawing showing a method for producing an injection-molded product in Example 12.
Figure 21:
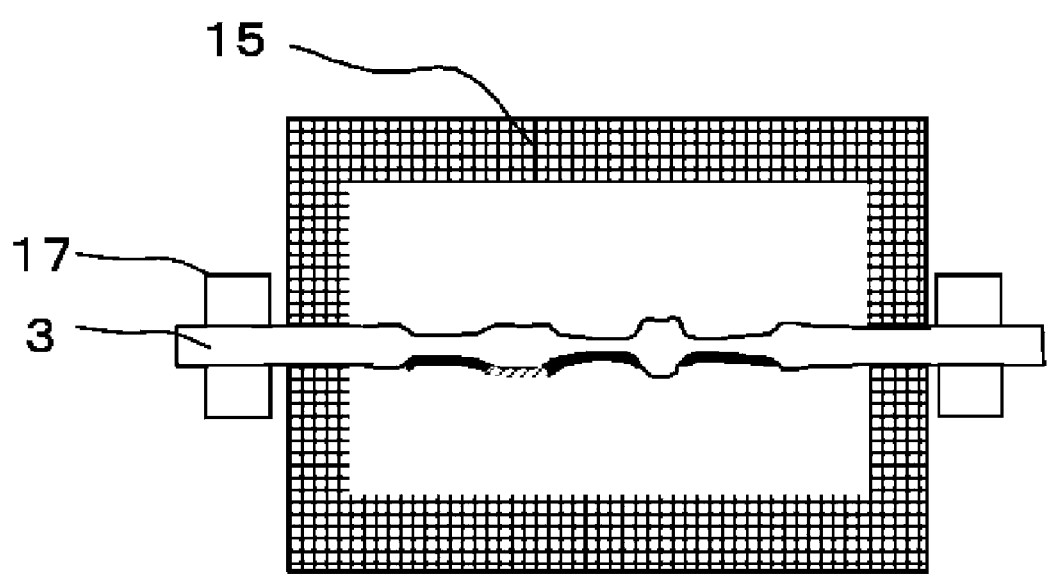
FIG. 21 is a schematic drawing showing a method for producing an injection-molded product in Example 12.
Figure 22:
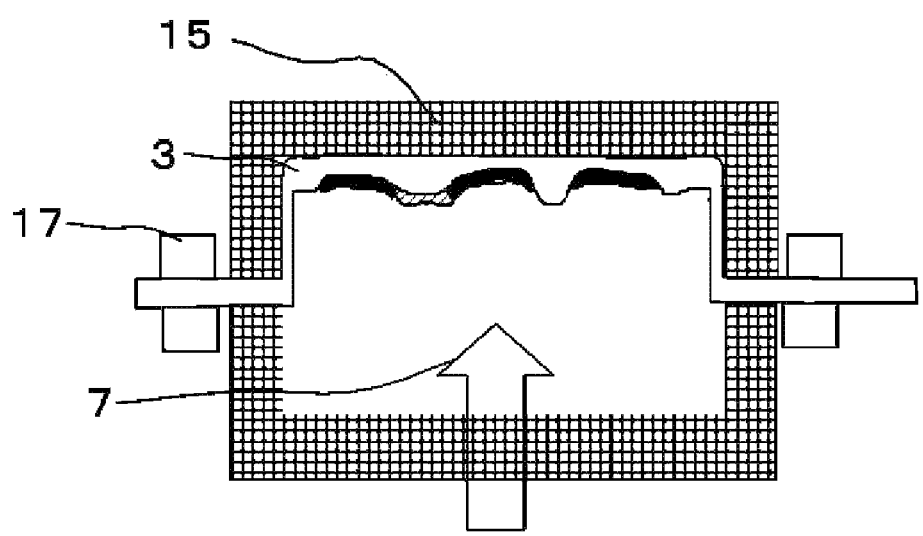
FIG. 22 is a schematic drawing showing a method for producing an injection-molded product in Example 12.

| Reference Signs List | |
|---|---|
| 1: | infrared heater |
| 2: | infrared ray |
| 3: | heat-shrinkable resin sheet |
| 4: | print portion of high-density infrared absorbing ink |
| 5: | print portion of low-density infrared absorbing ink |
| 6: | print portion of color ink (not absorbing infrared rays) |
| 7: | injection molding resin |
| 8: | ink G1, G2, G4, or G6 |
| 9: | ink G2 or G5 |
| 10: | ink GH1 or GH5 |
| 11: | ink GH2 or GH6 |
| 12: | ink GH3 |
| 13: | ink GH4 or GH7 |
| 15: | injection mold |
| 16: | surface protecting layer |
| 17: | clamp |

The invention claimed is:

1. A method for producing an injection-molded product having a patterned surface, the method comprising:
   a step of placing, in an injection mold, a heat-shrinkable resin sheet having a region A and a region B which have different surface temperatures when irradiated with infrared rays;
   a step of integrating the placed resin sheet with an injection molding resin by injecting the injection molding resin into the mold;
   before the step of placing or before the integration step, a step of irradiating the resin sheet with infrared rays so that surface temperatures of the region A and the region B are different from each other and so that the surface temperature of at least the region A is equal to or higher than an orientation release stress inflection point temperature T of the resin sheet, thereby forming a difference in thickness between the region A and the region B which leaves a pattern on the resin sheet; and
   after the integration step, a step of separating the resin sheet from the injected resin
   wherein the pattern of the resin sheet is transferred to a surface of the injected resin.

2. The method for producing an injection-molded product according to claim 1, wherein the region A or region B of the resin sheet is printed with an infrared absorbing ink or an infrared reflecting ink.

3. The method for producing an injection-molded product according to claim 1, wherein the resin sheet is composed of biaxially oriented polyethylene terephthalate.

* * * * *